US012192200B2

(12) United States Patent
Zhuang et al.

(10) Patent No.: US 12,192,200 B2
(45) Date of Patent: Jan. 7, 2025

(54) AS PAIR VERIFICATION METHOD, APPARATUS, AND DEVICE

(71) Applicant: HUAWEI TECHNOLOGIES CO., LTD., Guangdong (CN)

(72) Inventors: Shunwan Zhuang, Beijing (CN); Haibo Wang, Beijing (CN); Yunan Gu, Beijing (CN); Mingqing Huang, Beijing (CN); Zhongqi Xia, Shenzhen (CN); Gang Yan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 465 days.

(21) Appl. No.: 17/541,485

(22) Filed: Dec. 3, 2021

(65) Prior Publication Data
US 2022/0182381 A1 Jun. 9, 2022

(30) Foreign Application Priority Data
Dec. 4, 2020 (CN) .......................... 202011410695.2

(51) Int. Cl.
*H04L 9/40* (2022.01)
*H04L 45/745* (2022.01)

(52) U.S. Cl.
CPC ........ *H04L 63/0869* (2013.01); *H04L 45/745* (2013.01); *H04L 63/107* (2013.01)

(58) Field of Classification Search
CPC . H04L 63/0869; H04L 45/745; H04L 63/107; H04L 45/02; H04L 45/04; H04L 45/24; H04L 63/08; H04L 63/126
See application file for complete search history.

(56) References Cited

U.S. PATENT DOCUMENTS 7,930,424 B1 4/2011 Nucci et al.
2002/0150094 A1* 10/2002 Cheng .................. H04W 40/02
370/389

(Continued)

FOREIGN PATENT DOCUMENTS

CN 1764122 A 4/2006
CN 101588343 A 11/2009

(Continued)

OTHER PUBLICATIONS

Wang Hongjun et al., "A Method to Dynamically Detect BGP Configuration Errors", Jul. 2006, total: 3 pages.

(Continued)

*Primary Examiner* — Mohammed Waliullah

(57) ABSTRACT

This application relates to the field of computer network technologies and discloses an autonomous system (AS) pair verification method, apparatus, and device. The method can avoid incorrect determining of an AS pair in path information of an AS path during verification of the AS path, and improve accuracy of verifying the AS path. The method is applied to a network device. The method includes: obtaining path information including an AS pair; determining region information of a region to which the AS pair in the path information belongs; and verifying the AS pair based on the determined region information of the region to which the AS pair belongs, where the AS pair in the path information includes two adjacent AS numbers in the path information.

17 Claims, 8 Drawing Sheets

(56) References Cited

U.S. PATENT DOCUMENTS

| | | | | |
|---|---|---|---|---|
| 2003/0043820 A1* | 3/2003 | Goringe | ............... | H04L 45/02 370/255 |
| 2013/0125235 A1 | 5/2013 | Vaidyanathan et al. | | |

FOREIGN PATENT DOCUMENTS

| | | | | |
|---|---|---|---|---|
| CN | 106656818 A | * | 5/2017 | ............ H04L 45/02 |
| CN | 108886521 A | | 11/2018 | |
| CN | 111147380 A | | 5/2020 | |
| CN | 111385246 A | | 7/2020 | |
| KR | 20100043554 A | | 4/2010 | |
| KR | 20170094441 A | | 8/2017 | |
| KR | 20210080479 A | * | 6/2021 | |
| WO | 2020088684 A1 | | 5/2020 | |

OTHER PUBLICATIONS

Han Li-ning et al., "On algorithm of inferring Internet AS relationships", 2009,30 (10), total: 4 pages.

Office Action issued in CN202011410695.2, dated Oct. 9, 2022, 10 pages.

P. Mohapatra et al, BGP Prefix Origin Validation State Extended Community, RFC8097, Internet Engineering Task Force (IETF), Mar. 2017, 6 pages.

R. Bush et al, The Resource Public Key Infrastructure (RPKI) to Router Protocol, Version 1, Internet Engineering Task Force (IETF), RFC8210, Sep. 2017, 35 pages.

D. Ma et al, RPKI validated cache Update in SLURM over HTTPs (RUSH); draft-madi-sidrops-rush-01, SIDROPS, Jun. 4, 2020, 8 pages.

R. Bush et al, The Resource Public Key Infrastructure (RPKI) to Router Protocol, Version 2; draft-ietf-sidrops-8210bis-00, Network Working Group, Mar. 30, 2020, 37 pages.

A. Azimov et al, A Profile for Autonomous System Provider Authorization; draft-ietf-sidrops-aspa-profile-04, Network Working Group ,Nov. 2, 2020, 9 pages.

A. Azimov et al, Verification of AS_PATH Using the Resource Certificate Public Key Infrastructure and Autonomous System Provider Authorization; draft-ietf-sidrops-aspa-verification-06, Network Working Group, Nov. 2, 2020, 13 pages.

Vasileios Giotsas et al., "Inferring Complex AS Relationships", Nov. 5, 2014, total: 7 pages.

Jianhong Xia et al.,"On the Evaluation of AS Relationship Inferences", IEEE Communications Society Globecom 2004, total: 5 pages.

Extended European Search Report issued in EP21209801.6, dated Apr. 26, 2022, 12 pages.

Office Action issued in KR10-2021-0170816, dated May 4, 2023, with English translation, 8 pages.

* cited by examiner

AS PAIR VERIFICATION METHOD, APPARATUS, AND DEVICE

CROSS-REFERENCE TO RELATED APPLICATIONS

This application claims priority to Chinese Patent Application No. 202011410695.2, filed on Dec. 4, 2020, which is hereby incorporated by reference in its entirety.

TECHNICAL FIELD

This application relates to the field of computer network technologies, and in particular, to an autonomous system (AS) pair verification method, apparatus, and device.

BACKGROUND

An autonomous system (AS) is an internet protocol (IP) network managed by an entity and having a unified routing policy. A security factor is not considered during initial design of the border gateway protocol (BGP). Consequently, when BGP routing information is transmitted between neighbor ASs having a preset business relationship, a routing information leak is prone to occur. The routing information leak often causes traffic to travel over a longer path, and consequently causes an increase in traffic transmission latency. Further, a serious routing information leak may further result in security risks such as abnormal route access interruption, traffic listening, a man-in-the-middle attack, and a spoofing attack.

To prevent a route leak, an AS may usually verify all AS pairs in path information of an AS path in received BGP routing information according to a valley free principle by using a resource public key infrastructure (RPKI) mechanism, to determine validity of the AS path, and further determine security of the BGP route. However, when the AS verifies the received path information of the AS path by using the conventional technology, the AS may incorrectly determine an AS pair in the path information of the AS path. As a result, a verification result of the AS path is incorrect.

Based on this, how to avoid incorrect determining of an AS pair in path information of an AS path during verification of the AS path is a technical problem to be urgently resolved in the conventional technology.

SUMMARY

Embodiments of this application provide an AS pair verification method, apparatus, and device. The method can avoid incorrect determining of an AS pair in path information of an AS path during verification of the AS path, and improve accuracy of verifying the AS path.

According to a first aspect, an embodiment of this application provides an AS pair verification method, and the method may be applied to a network device. The method includes: obtaining path information including an AS pair; determining region information of a region to which the AS pair in the path information belongs; and then verifying the AS pair based on the determined region information of the region to which the AS pair belongs. The AS pair in the path information includes two adjacent AS numbers in the path information.

When the AS pair is verified by using the AS pair verification method provided in this embodiment, the region information of the region to which the AS pair belongs is introduced to verify the AS pair. This can avoid a case in which a business relationship is incorrectly determined because a same AS pair has different business relationships in different regions during verification of the AS pair in the path information. Further, the AS pair can be accurately verified, and when validity of a path corresponding to the path information including the AS pair is verified according to a valley free principle, verification accuracy is accordingly improved.

In an example embodiment, the verifying the AS pair based on the determined region information of the region to which the AS pair belongs includes: verifying the AS pair based on the determined region information of the region to which the AS pair belongs and an authorization entry database.

In another example embodiment, the verifying the AS pair based on the determined region information of the region to which the AS pair belongs and an authorization entry database includes: when the authorization entry database includes an authorization entry that includes the AS pair and a region identifier corresponding to the region information of the region to which the AS pair belongs, determining that the AS pair is successfully verified.

In another example embodiment, the verifying the AS pair based on the determined region information of the region to which the AS pair belongs and an authorization entry database includes: when the authorization entry database does not include an authorization entry that includes the AS pair and a region identifier corresponding to the region information of the region to which the AS pair belongs, determining that the AS pair fails to be verified.

In the foregoing several possible implementations, because the authorization entry database includes the region identifier of the region to which the AS pair belongs, when the AS pair is verified from the authorization entry database based on the region information of the region to which the AS pair belongs, not only an AS pair the same as the to-be-verified AS pair needs to be matched from the authorization entry database, but also whether a region identifier of the AS pair the same as the to-be-verified AS pair matches the region information of the region to which the to-be-verified AS pair belongs needs to be determined from the authorization entry database.

This can avoid a case in which a business relationship is incorrectly determined because a same AS pair has different business relationships in different regions during verification of the AS pair in the path information. Further, the AS pair can be accurately verified, and when the validity of the path corresponding to the path information including the AS pair is verified according to a valley free principle, verification accuracy is accordingly improved.

In another example embodiment, the determining region information of a region to which the AS pair in the path information belongs includes: determining, from routing information including the path information, the region information of the region to which the AS pair belongs; or determining, based on a prefix in the routing information, the region information of the region to which the AS pair belongs.

In this possible implementation, the region information of the region to which the AS pair in the path information belongs may be obtained. In this way, the network device can verify the AS pair in the authorization entry database based on the region information. This improves accuracy of verifying the AS pair.

It should be noted that in embodiments of this application, the region information of the region to which the AS pair belongs may be obtained in any manner that can be used to obtain the region information.

In another example embodiment, before the verifying the AS pair based on the determined region information of the region to which the AS pair belongs and an authorization entry database, the method further includes: obtaining the authorization entry database.

In another example embodiment, the authorization entry database includes a first authorization entry database; and the obtaining the authorization entry database includes: receiving a protocol data unit (PDU) message from a server, where the PDU message includes an AS pair having a preset business relationship and a region identifier of a region to which the AS pair having the preset business relationship belongs; and then generating the first authorization entry database based on the received PDU message.

In another example embodiment, the authorization entry database further includes a second authorization entry database; and the obtaining the authorization entry database includes: generating the second authorization entry database based on a network routing table and/or network data, where the network routing table and/or the network data includes the AS pair having the preset business relationship and region information of the region to which the AS pair having the preset business relationship belongs.

In the foregoing several possible implementations, the network device may locally construct, in different manners, the authorization entry database that includes the identifier of the region to which the AS pair belongs. In this way, the AS pair can be accurately verified based on the constructed authorization entry database and the region information of the region to which the to-be-verified AS pair belongs. This improves accuracy of verifying the path corresponding to the path information including the AS pair.

In another example embodiment, the verifying the AS pair based on the determined region information of the region to which the AS pair belongs and an authorization entry database includes: verifying the AS pair based on the region information of the region to which the AS pair belongs and the first authorization entry database; and if the AS pair fails to be verified, verifying the AS pair based on the region information of the region to which the AS pair belongs and the second authorization entry database.

In this possible implementation, the network device may first verify the AS pair based on the region information of the region to which the AS pair belongs and the first authorization entry database obtained from the server. When the AS pair fails to be verified, the network device may re-verify the AS pair based on the region information of the region to which the AS pair belongs and the second authorization entry database obtained by analyzing the network routing table and/or the network data. In this way, when authorization data of the server is not comprehensive enough, the to-be-verified AS pair may be further verified by using authorization data obtained by analyzing the network routing table and/or the network data. This further reduces a rate of incorrect determining during verification of the AS pair.

In another example embodiment, the verifying the AS pair based on the determined region information of the region to which the AS pair belongs and an authorization entry database includes: verifying the AS pair based on the region information of the region to which the AS pair belongs and a target authorization entry that is in the authorization entry database and that corresponds to the prefix in the path information, where an IP version of an AS pair in the target authorization entry is the same as an IP version in the prefix in the path information.

This possible implementation eliminates impact caused to verification of the AS pair in the path information because ASs use different IP versions.

In another example embodiment, the path information includes a plurality of AS numbers arranged in a preset order, and the plurality of AS numbers are used to indicate the path corresponding to the path information; and the method further includes: sequentially verifying all AS pairs in the path information, to verify the path corresponding to the path information.

In this possible implementation, the AS pair is verified by using the method provided in embodiments of this application. This can avoid a case in which a business relationship is incorrectly determined because a same AS pair has different business relationships in different regions during verification of the AS pair in the path information. In this way, the AS pair can be accurately verified, and when the validity of the path corresponding to the path information including the AS pair is verified according to the valley free principle, verification accuracy is accordingly improved.

In another example embodiment, the method further includes: when the AS pair in the path information fails to be verified for the first time, reversing an AS pair that has not been verified in the path information; and then verifying a reversed AS pair, to complete verification of the path corresponding to the path information.

In this possible implementation, when an authorization entry database is constructed, only a database including a single business relationship needs to be constructed. This improves efficiency of constructing the authorization entry database. Because only a C2P AS pair, a P2C AS pair, and a P2P AS pair are usually included during verification of the path information, an authorization entry database including only the C2P AS pair may be constructed, or an authorization entry database including only the P2C AS pair may be constructed. When the AS pair fails to be verified for the first time, only an AS pair that has not been verified needs to be reversed subsequently. When the path is valid, the same AS pair can be found through matching from the authorization entry database for a reversed AS pair, so that verification can be smoothly performed.

In another example embodiment, the method further includes: if the path information includes at most one AS pair that fails to be verified, determining that the path corresponding to the path information is successfully verified.

In another example embodiment, the method further includes: generating a first forwarding entry based on the path information.

In the two possible implementations, the network device generates a forwarding entry based on the path information corresponding to the path that is successfully verified. Because the path corresponding to the forwarding entry is successfully verified, the forwarding entry is a secure forwarding entry. In this way, when forwarding a message subsequently, the network device can use the secure forwarding entry, without causing a route leak. This ensures security of transmitted data.

In another example embodiment, the method further includes: if the path information includes at least two AS pairs that fail to be verified, determining that the path corresponding to the path information fails to be verified.

In another example embodiment, the method further includes: generating a second forwarding entry based on the path information; and then marking specific information for the second forwarding entry, where the specific information is used to indicate whether the second forwarding entry is a high-risk forwarding entry or a low-priority forwarding entry.

In the two possible implementations, the network device may generate a forwarding entry based on the path information corresponding to the path that fails to be verified. Because the path corresponding to the forwarding entry fails to be verified, that is, the forwarding entry is an insecure forwarding entry, when a message is forwarded by using the forwarding entry, a route leak may occur, and a data leak is caused. Further, specific information is marked for these insecure forwarding entries, to remind the network device to comprehensively consider a risk brought by the forwarding entries during use of the forwarding entries. For example, the forwarding entries are not used to forward a data message having a relatively high security requirement. In other words, the network device may use these forwarding entries based on actual situations. This improves flexibility of using a forwarding entry by the network device.

In another example embodiment, if the network device is a network device in a first AS, the method further includes: sending a verification result of the path corresponding to the path information to a target device, where the target device is a device that is in the first AS and that is connected to the network device for communication.

According to the example embodiment, after receiving a BGP update message including the path information, the target device may process the path information based on the verification result, without verifying the path information. This reduces used resources of the target device, and improves efficiency of the target device.

In another example embodiment, the "obtaining path information including an AS pair" includes: obtaining a border gateway protocol (BGP) update message, where the BGP update message includes the path information.

In another example embodiment, the method further includes: after receiving the BGP update message, verifying the AS pair in the path information in the BGP update message, to verify the path corresponding to the path information; or before sending the BGP update message, verifying the AS pair in the path information in the BGP update message, to verify the path corresponding to the path information.

In this possible implementation, an occasion in which the network device verifies the path corresponding to the path information including the AS pair is relatively flexible. To be specific, the network device may verify the path after receiving the path information, or may verify the path before sending the path information and after receiving the path information or generating the path information. This indicates that the method provided in embodiments of this application is applicable to a plurality of scenarios, and therefore increases an application scope of the method in embodiments of this application.

According to a second aspect, an embodiment of this application provides an autonomous system (AS) pair verification apparatus, and the apparatus is applied to a network device. The apparatus includes: an obtaining unit, configured to obtain path information, where the path information includes an AS pair, and the AS pair includes two adjacent AS numbers in the path information; and a processing unit, configured to: determine region information of a region to which the AS pair belongs; and verify the AS pair based on the region information.

In an example embodiment, the processing unit is further configured to verify the AS pair based on the region information and an authorization entry database.

In another example embodiment, the processing unit is configured to: when the authorization entry database includes an authorization entry that includes the AS pair and a region identifier corresponding to the region information, determine that the AS pair is successfully verified.

In another example embodiment, the processing unit is configured to: when the authorization entry database does not include an authorization entry that includes the AS pair and a region identifier corresponding to the region information, determine that the AS pair fails to be verified.

In another example embodiment, the processing unit is further configured to: determine, from routing information including the path information, the region information of the region to which the AS pair belongs; or determine, based on a prefix in the routing information, the region information of the region to which the AS pair belongs.

In another example embodiment, the obtaining unit is further configured to obtain the authorization entry database.

In another example embodiment, the authorization entry database includes a first authorization entry database, and the apparatus further includes a receiving unit, configured to receive a protocol data unit (PDU) message from a server, where the PDU message includes an AS pair having a preset business relationship and a region identifier of a region to which the AS pair having the preset business relationship belongs; and the processing unit is further configured to generate the first authorization entry database based on the PDU message.

In another example embodiment, the authorization entry database further includes a second authorization entry database; and the processing unit is further configured to generate the second authorization entry database based on a network routing table and/or network data. The network routing table and/or the network data includes the AS pair having the preset business relationship and region information of the region to which the AS pair having the preset business relationship belongs.

In another example embodiment, the processing unit is further configured to: verify the AS pair based on the region information and the first authorization entry database; and if the AS pair fails to be verified, verify the AS pair based on the region information and the second authorization entry database.

In another example embodiment, the processing unit is further configured to verify the AS pair based on the region information and a target authorization entry that is in the authorization entry database and that corresponds to the prefix in the path information, where an internet protocol (IP) version of an AS pair in the target authorization entry is the same as an IP version in the prefix in the path information.

In another example embodiment, the path information includes a plurality of AS numbers arranged in a preset order, and the plurality of AS numbers are used to indicate a path corresponding to the path information; and the processing unit is further configured to sequentially verify all AS pairs in the path information, to verify the path corresponding to the path information.

In another example embodiment, the processing unit is further configured to: when the AS pair in the path information fails to be verified for the first time, reverse an AS pair that has not been verified in the path information; and verify a reversed AS pair, to complete verification of the path corresponding to the path information.

In another example embodiment, the processing unit is further configured to: if the path information includes at most one AS pair that fails to be verified, determine that the path corresponding to the path information is successfully verified.

In another example embodiment, the processing unit is further configured to generate a first forwarding entry based on the path information.

In another example embodiment, the processing unit is further configured to: if the path information includes at least two AS pairs that fail to be verified, determine that the path corresponding to the path information fails to be verified.

In another example embodiment, the processing unit is further configured to: generate a second forwarding entry based on the path information; and mark specific information for the second forwarding entry, where the specific information is used to indicate whether the second forwarding entry is a high-risk forwarding entry or a low-priority forwarding entry.

In another example embodiment, if the network device is a network device in a first AS, the apparatus further includes: a sending unit, configured to send a verification result of the path corresponding to the path information to a target device, where the target device is a device that is in the first AS and that is connected to the network device for communication.

In another example embodiment, the obtaining unit is further configured to obtain a border gateway protocol (BGP) update message, where the BGP update message includes the path information.

In another example embodiment, the processing unit is further configured to: after the BGP update message is received, verify the AS pair in the path information in the BGP update message, to verify the path corresponding to the path information; or before the BGP update message is sent, verify the AS pair in the path information in the BGP update message, to verify the path corresponding to the path information.

It should be understood that the functional modules/units obtained through division may be integrated into one or more units/modules. For descriptions of possible technical solutions performed by the function modules/units obtained through division and descriptions of beneficial effects, refer to the descriptions of the technical solutions according to the first aspect or corresponding example embodiments of the first aspect.

According to a third aspect, an embodiment of this application provides an AS pair verification apparatus. The AS pair verification apparatus includes a memory and one or more processors. The memory is coupled to the processor. The memory is configured to store computer instructions. The processor is configured to invoke the computer instructions, to perform the method according to any one of the first aspect or the example embodiments of the first aspect.

According to a fourth aspect, an embodiment of this application provides an AS pair verification device. The device is a network device in an AS. The device is configured to perform the method according to any one of the first aspect or the example embodiments of the first aspect.

According to a fifth aspect, an embodiment of this application provides a computer-readable storage medium, for example, a non-transient computer-readable storage medium. The computer-readable storage medium stores a computer program (or instructions). When the computer program (or instructions) is run on an AS pair verification apparatus, the AS pair verification apparatus is enabled to perform the method according to any possible implementation of the first aspect.

According to a sixth aspect, an embodiment of this application provides a computer program product. When the computer program product runs on an AS pair verification apparatus, the method according to any possible implementation of the first aspect is performed.

According to a seventh aspect, an embodiment of this application provides a chip system, including a processor. The processor is configured to invoke and run, from a memory, a computer program stored in the memory, to perform the method according to any implementation of the first aspect.

It may be understood that any one of the apparatus, the computer storage medium, the computer program product, the chip system, or the like provided above may be applied to a corresponding method provided above. Therefore, for beneficial effects that can be achieved by the apparatus, the computer storage medium, the computer program product, the chip system, or the like, refer to the beneficial effects of the corresponding method.

In the embodiments of this application, a name of the AS pair verification apparatus does not constitute any limitation on devices or functional modules. During actual implementation, these devices or functional modules may have other names. The devices or functional modules fall within the scope of the claims and their equivalent technologies in the embodiments of this application, provided that functions of the devices or functional modules are similar to those described in the embodiments of this application.

DESCRIPTION OF EMBODIMENTS

Figure 1:
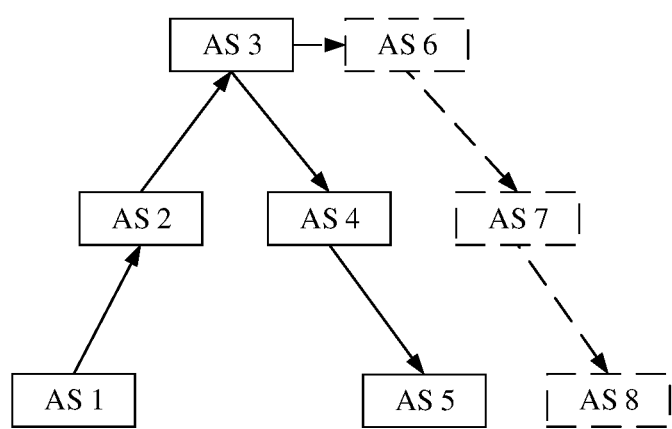
FIG. 1 is a schematic diagram of a valid AS path according to an embodiment of this application.

To better understand the embodiments of this application, the following describes some terms or technologies used in the embodiments of this application.

(1) AS Neighbor Business Relationship

The AS neighbor business relationship is a relationship of a business contract signed between two neighbor ASs about a traffic forwarding payment manner. Basic business relationships include a consumer to provider (C2P) relationship, a provider to customer (P2C) relationship, and a peer to peer (P2P) relationship, and a sibling to sibling (S2S) relationship.

The C2P relationship means that a customer AS serves as a BGP route sender, pays a provider AS, and sends a route of the customer AS and a route of a customer to the internet via the provider AS, to implement communication between the customer AS and the internet via the provider AS. It can be learned that the provider AS is a BGP route receiver.

The P2C relationship may be understood as a reverse description of the C2P relationship, and content specified by the P2C relationship is the same as content specified by the C2P relationship. A difference is that the C2P relationship is described from a perspective of the customer AS, whereas the P2C relationship is described from a perspective of the provider AS.

In addition, two ASs with the P2P relationship are peer to peer, and the peer-to-peer ASs are bilaterally free. However, from an economic perspective, either of the two peer-to-peer ASs does not expect the other AS to access the internet via the AS. Therefore, either of the two peer-to-peer ASs advertises only a route of the AS and a route of a customer to the other AS.

Two ASs with the S2S relationship belong to a same organization, and can exchange traffic freely without any fee.

(2) Other Terms

In the present disclosure, the term "example" or "for example" is used to represent giving an example, an illustration, or a description. Any embodiment or design scheme described as an "example" or with "for example" in the present disclosure should not be explained as being more preferred or having more advantages than another embodiment or design scheme. Exactly, use of the term such as "example" or "for example" is intended to present a related concept in a specific manner.

The terms "first" and "second" in the present disclosure are merely intended for a purpose of description, and should not be understood as an indication or implication of relative importance or implicit indication of a quantity of indicated technical features. Therefore, a feature limited by "first" or "second" may explicitly or implicitly include one or more features. In the present disclosure, unless otherwise specified, "a plurality of" means two or more than two.

The term "at least one" in the present disclosure means one or more, and the term "a plurality of" in this disclosure means two or more than two. For example, "a plurality of second messages" means two or more than two second messages. The terms "system" and "network" may be used interchangeably in this specification.

It should be understood that the terms used in the descriptions of the various examples in this specification are merely intended to describe specific examples, but are not intended to limit this specification. The terms "one" ("a", "an") and "the" of singular forms used in the descriptions of various examples and the appended claims are also intended to include plural forms, unless otherwise specified in the context clearly.

It should be further understood that the term "and/or" used in this specification indicates and includes any or all possible combinations of one or more items in associated listed items. The term "and/or" describes an association relationship for describing associated objects and represents that three relationships may exist. For example, A and/or B may represent the following three cases: Only A exists, both A and B exist, and only B exists. In addition, the character "/" in this application usually indicates an "or" relationship between associated objects.

It should be further understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

It should be understood that determining B based on A does not mean that B is determined based on only A, but B may alternatively be determined based on A and/or other information.

It should be further understood that the term "include" (also referred to as "includes", "including", "comprises", and/or "comprising"), when being used in this specification, specifies the presence of stated features, integers, steps, operations, elements, and/or components, but do not preclude the presence or addition of one or more other features, integers, steps, operations, elements, components, and/or groups thereof.

It should be further understood that the term "if" may be interpreted as a meaning "when" (or "upon"), "in response to determining", or "in response to detecting". Similarly, according to the context, the phrase "if it is determined that" or "if (a stated condition or event) is detected" may be interpreted as a meaning of "when it is determined that", "in response to determining", "when (a stated condition or event) is detected", or "in response to detecting (a stated condition or event)".

It should be understood that "one embodiment", "an embodiment", or "a possible implementation" mentioned throughout specification means that particular features, structures, or characteristics related to the embodiments or implementations are included in at least one embodiment of this application. Therefore, "in one embodiment", "in an embodiment", or "in a possible implementation" appearing throughout this specification does not necessarily refer to a same embodiment. In addition, these particular features, structures, or characteristics may be combined in one or more embodiments in any proper manner.

It should be understood that BGP routing information includes path information of an AS path (which is briefly referred to as AS path information below), and one piece of AS path information may include a plurality of AS numbers (ASN) arranged in a first preset order (corresponding to a preset order in the embodiments of this application). Each AS number in the AS path information uniquely identifies one AS. In this way, the first preset order is used to indicate an order of a plurality of ASs that are identified by the plurality of AS numbers and that are passed through in the AS path indicated by the AS path information.

Among the plurality of AS numbers arranged in the first preset order, two adjacent AS numbers are one AS pair. To be specific, the AS path information includes a plurality of AS pairs, and the plurality of AS pairs are also arranged in the first preset order.

In an example, path information of an AS path 1 includes (an ASN 3, an ASN 2, and an ASN 1). In this case, in the AS path 1, a start AS may be an AS identified by the ASN 1, and an end AS may be an AS identified by the ASN 3. To be specific, an arrangement order of the ASN 1, the ASN 2, and the ASN 3 indicates that in the AS path 1, the AS identified by the ASN 1, an AS identified by the ASN 2, and the AS identified by the ASN 3 are sequentially passed through. The path information of the AS path 1 includes two AS pairs: ASN 1:ASN 2 and ASN 2:ASN 3.

Any AS pair in the AS path information may be sequence numbers of a pair of neighbor ASs having a preset AS neighbor business relationship. The preset AS neighbor business relationship may be any one of the C2P relationship, P2C relationship, P2P relationship, or S2S relationship described above.

For brief description, in the contexts of the following embodiments of this application, an AS pair having the C2P relationship is referred to as a C2P AS pair, an AS pair having the P2C relationship is referred to as a P2C AS pair, an AS pair having the P2P relationship is referred to as a P2P AS pair, and an AS pair having the S2S relationship is referred to as an S2S AS pair.

For any AS pair having the C2P relationship or the P2C relationship, an order of neighbor ASs of the AS pair corresponds to a business relationship between the AS pair.

In an example, for an AS pair 1, that is, ASN 1:ASN 2, if the AS pair 1 is a C2P AS pair, an AS identified by the ASN 1 is a customer AS, and an AS identified by the ASN 2 is a provider AS. If the AS pair 1 is a P2C AS pair, an AS identified by the ASN 1 is a provider AS, and an AS identified by the ASN 2 is a customer AS.

Currently, a valley free principle is usually used to detect whether a route leak occurs on AS path information in a piece of BGP routing information, to avoid impact caused by a BGP route leak.

The valley free principle is that, for AS path information in any BGP routing information, the AS path information can include only at least one of m C2P AS pairs, 0 or 1 P2P AS pair, or n P2C AS pairs that are strictly arranged in a second preset order, where m and n are integers greater than or equal to 0.

The second preset order includes the following: A C2P AS pair may be followed by at least one of 0 or more C2P AS pairs, a P2P AS pair, or 0 or more P2C AS pairs; a P2P AS pair is followed by only 0 or more P2C AS pairs; and a P2C AS pair is followed by only 0 or more P2C AS pairs.

To be specific, if a path indicated by AS path information that includes only a C2P AS pair is referred to as an upstream path, and a path indicated by AS path information that includes only a P2C AS pair is referred to as a downstream path, according to the valley free principle, wave peaks or wave valleys formed by upstream paths and downstream paths may not repeatedly occur in an AS path that includes both the upstream paths and the downstream paths. This satisfies a profit maximization principle.

In this case, when an arrangement order of the AS pairs in the AS path information satisfies the valley free principle, it may be considered that no route leak occurs on the AS path information, in other words, the AS path indicated by the AS path information is valid. When an arrangement order of the AS pairs in the AS path information does not satisfy the valley free principle, it may be considered that a route leak occurs on the AS path information, in other words, the AS path indicated by the AS path information is invalid.

For example, FIG. 1 is a schematic diagram of a valid AS path.

As shown in FIG. 1, path information of an AS path 1 shown in FIG. 1 includes (an ASN 5, an ASN 4, an ASN 3, an ASN 2, and an ASN 1).

In the AS path 1, a start AS is an AS identified by the ASN 1, and an end AS is an AS identified by the ASN 5. The path information of the AS path 1 includes four AS pairs: ASN 1:ASN 2, ASN 2:ASN 3, ASN 3:ASN 4, and ASN 4:ASN 5. Both ASN 1:ASN 2 and ASN 2:ASN 3 are C2P AS pairs, and both ASN 3:ASN 4 and ASN 4:ASN 5 are P2C AS pairs.

It can be learned that, in ASN 1:ASN 2, an AS identified by the ASN 2 is an AS serving as a provider, and in ASN 2:ASN 3, the AS identified by the ASN 2 is an AS serving as a customer. Similarly, in ASN 3:ASN 4, an AS identified by the ASN 4 is an AS serving as a customer, and in ASN 4:ASN 5, the AS identified by the ASN 4 is an AS serving as a provider.

It can be learned that, in the path information of the AS path 1, ASN 1:ASN 2 having a C2P relationship is followed by ASN 2:ASN 3 having a C2P relationship, and ASN 3:ASN 4 and ASN 4:ASN 5 each having a P2C relationship. ASN 2:ASN 3 having the C2P relationship is followed by only ASN 3:ASN 4 and ASN 4:ASN 5 each having the P2C relationship. ASN 3:ASN 4 having the P2C relationship is followed by only ASN 4:ASN 5 having the P2C relationship.

Therefore, an arrangement order of the AS pairs in the path information of the AS path 1 satisfies a valley free principle, in other words, the AS path 1 is valid.

Path information of an AS path 2 shown in FIG. 1 includes (an ASN 8, an ASN 7, an ASN 6, the ASN 3, the ASN 2, and the ASN 1).

In the AS path 2, a start AS is the AS identified by the ASN 1, and an end AS is an AS identified by the ASN 8. The path information of the AS path 2 includes five AS pairs: ASN 1:ASN 2, ASN 2:ASN 3, ASN 3:ASN 6, ASN 6:ASN 7, and ASN 7:ASN 8. Both ASN 1:ASN 2 and ASN 2:ASN 3 are C2P AS pairs, ASN 3:ASN 6 is a P2P AS pair, and both ASN 6:ASN 7 and ASN 7:ASN 8 are P2C AS pairs.

It can be learned that, in the path information of the AS path 2, ASN 1:ASN 2 having a C2P relationship is followed by ASN 2:ASN 3 having a C2P relationship, ASN 3:ASN 6 having a P2P relationship, and ASN 6:ASN 7 and ASN 7:ASN 8 each having a P2C relationship. ASN 2:ASN 3 having the C2P relationship is followed by ASN 3:ASN 6 having the P2P relationship, and ASN 6:ASN 7 and ASN 7:ASN 8 each having the P2C relationship. ASN 3:ASN 6 having the P2P relationship is followed by only ASN 6:ASN 7 and ASN 7:ASN 8 each having the P2C relationship. ASN 6:ASN 7 having the P2C relationship is followed by only ASN 7:ASN 8 having the P2C relationship.

Therefore, an arrangement order of the AS pairs in the path information of the AS path 2 satisfies the valley free principle, in other words, the AS path 2 is also valid.

Figure 2A:
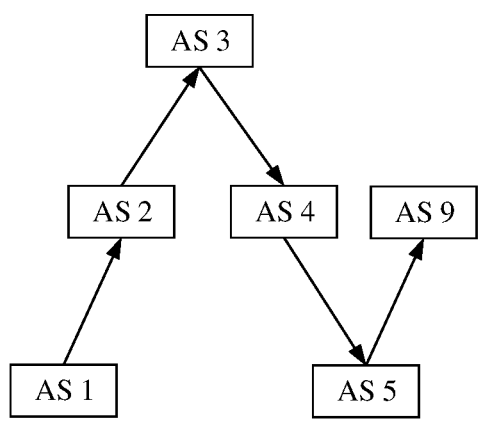
FIG. 2(a) and FIG. 2(b) are schematic diagrams of invalid AS paths according to an embodiment of this application.

FIG. 2($a$) and FIG. 2($b$) are schematic diagrams of invalid AS paths.

As shown in FIG. 2($a$), path information of an AS path 1 includes (an ASN 9, an ASN 5, an ASN 4, an ASN 3, an ASN 2, and an ASN 1).

In the AS path 1, a start AS is the AS identified by the ASN 1, and an end AS is an AS identified by the ASN 9. The path information of the AS path 1 includes five AS pairs: ASN 1:ASN 2, ASN 2:ASN 3, ASN 3:ASN 4, ASN 4:ASN 5, and ASN 5:ASN 9. All of ASN 1:ASN 2, ASN 2:ASN 3, and ASN 5:ASN 9 may be C2P AS pairs, and both ASN 3:ASN 4 and ASN 4:ASN 5 may be P2C AS pairs.

It can be learned that, in the path information of the AS path 1, ASN 4:ASN 5 having a P2C relationship is followed by ASN 5:ASN 9 having a C2P relationship. It can be learned that an arrangement order of the AS pair ASN 4:ASN 5 and the AS pair ASN 5:ASN 9 in the path information of the AS path 1 does not satisfy a valley free principle, in other words, the AS path 1 is invalid.

Figure 2B:
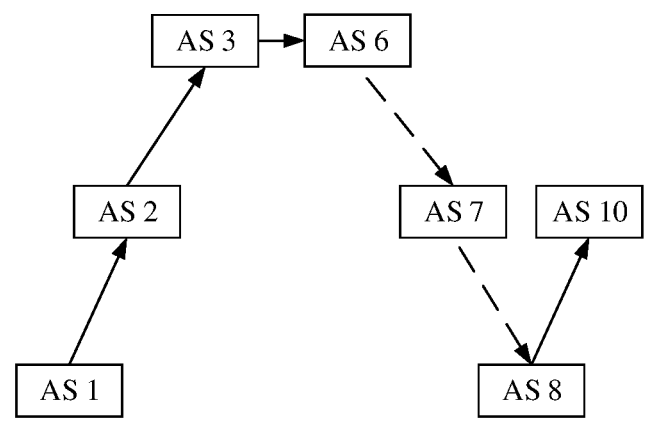

Path information of an AS path 2 shown in FIG. 2(b) includes (an ASN 10, an ASN 8, an ASN 7, an ASN 6, an ASN 3, an ASN 2, and an ASN 1).

In the AS path 2, a start AS is the AS identified by the ASN 1, and an end AS is an AS identified by the ASN 10. The path information of the AS path 2 includes six AS pairs: ASN 1:ASN 2, ASN 2:ASN 3, ASN 3:ASN 6, ASN 6:ASN 7, ASN 7:ASN 8, and ASN 8:ASN 10. All of ASN 1:ASN 2, ASN 2:ASN 3, and ASN 8:ASN 10 are C2P AS pairs, ASN 3:ASN 6 is a P2P AS pair, and both ASN 6:ASN 7 and ASN 7:ASN 8 are P2C AS pairs.

It can be learned that, in the path information of the AS path 2, ASN 7:ASN 8 having a P2C relationship is followed by ASN 8:ASN 10 having a C2P relationship. It can be learned that an arrangement order of the AS pair ASN 7:ASN 8 and the AS pair ASN 8:ASN 10 in the path information of the AS path 2 does not satisfy the valley free principle, in other words, the AS path 2 is also invalid.

However, when validity of an AS path indicated by AS path information in BGP routing information is verified according to the valley free principle, a business relationship between an AS pair in the AS path information is often incorrectly determined. Consequently, an error occurs during verification of the validity of the AS path indicated by the AS path information.

Usually, the business relationship between the AS pair in the AS path information is incorrectly determined because the same AS pair may have different business relationships in different regions.

In an example, in a region A, an AS pair 1 is an AS pair having a C2P relationship. However, in a region B, the AS pair 1 is an AS pair having a P2C relationship.

In the region B, when validity of an AS path indicated by AS path information including the AS pair 1 is verified according to the foregoing valley free principle, a business relationship between the AS pair 1 in the region A may be considered as a business relationship between the AS pair 1 in the region B, to determine whether the AS path indicated by the AS path information is valid. In this case, in the region B, although the AS path is actually a valid AS path, the AS path is determined to be invalid; or although the AS path is actually an invalid AS path, the AS path is determined to be valid.

In view of this, an embodiment of this application provides an AS pair verification method. In the method, a region identifier of a region to which each AS pair belongs is added to an authorization entry database used to verify the AS pair. This can avoid a case in which validity of an AS path indicated by path information in BGP routing information is incorrectly determined because a business relationship between an AS pair in the path information is incorrectly determined when the validity of the AS path is verified according to a valley free principle.

Therefore, the AS pair verification method provided in this embodiment improves accuracy of verifying the validity of the AS path indicated by the path information including the AS pair.

An embodiment of this application further provides an AS pair verification apparatus (which is briefly referred to as a verification apparatus below). The verification apparatus may be any network device that needs to verify an AS pair.

For example, the network device may be a network analysis device, a network control device, a gateway device, or a routing device. This is not limited herein.

Figure 3:
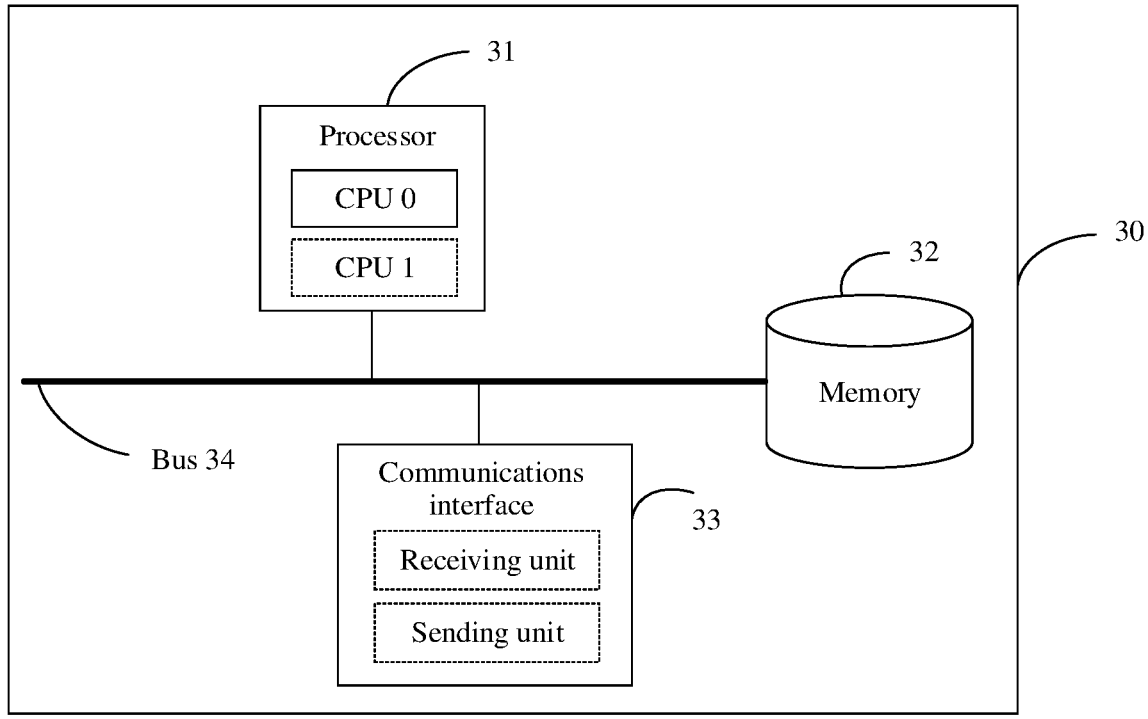
FIG. 3 is a schematic diagram of a hardware structure of a network device according to an embodiment of this application.

FIG. 3 is a schematic diagram of a hardware structure of a network device 30 according to an embodiment of this application.

As shown in FIG. 3, the network device 30 includes a processor 31, a memory 32, a communications interface 33, and a bus 34. The processor 31, the memory 32, and the communications interface 33 may be connected to each other through the bus 34.

The processor 31 is a control center of the network device 30, and may be a general-purpose central processing unit (CPU), or may be another general-purpose processor or the like. The general-purpose processor may be a microprocessor, any conventional processor, or the like.

In an example, the processor 31 may include one or more CPUs, for example, a CPU 0 and a CPU 1 that are shown in FIG. 3.

The memory 32 may be a read-only memory (ROM) or another type of static storage device capable of storing static information and instructions, or a random access memory (RAM) or another type of dynamic storage device capable of storing information and instructions; may be an electrically erasable programmable read-only memory (EEPROM), a magnetic disk storage medium or another magnetic storage device, or any other medium capable of carrying or storing expected program code in a form of an instruction or a data structure and capable of being accessed by a computer. However, this is not limited herein.

In a possible implementation, the memory 32 may be independent of the processor 31. The memory 32 may be connected to the processor 31 through the bus 34, and is configured to store data, instructions, or program code. When invoking and executing the instructions or the program code stored in the memory 32, the processor 31 can implement an AS pair verification method provided in the embodiments of this application.

In another possible implementation, the memory 32 may alternatively be integrated with the processor 31.

The communications interface 33 is configured to connect the network device 30 to another device (such as a server) by using a communications network. The communications network may be the Ethernet, a radio access network (RAN), a wireless local area network (WLAN), or the like. The communications interface 33 may include a receiving unit configured to receive data and a sending unit configured to send data.

The bus 34 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 3, but this does not mean that there is only one bus or only one type of bus.

It should be noted that the structure shown in FIG. 3 does not constitute a limitation on the network device. In addition to the components shown in FIG. 3, the network device 30 may include more or fewer components than those shown in the figure, combine some components, or have different component arrangements.

An embodiment of this application further provides an AS pair verification system (which is briefly referred to as a verification system below). The verification system is a verification system based on an RPKI mechanism.

Figure 4:
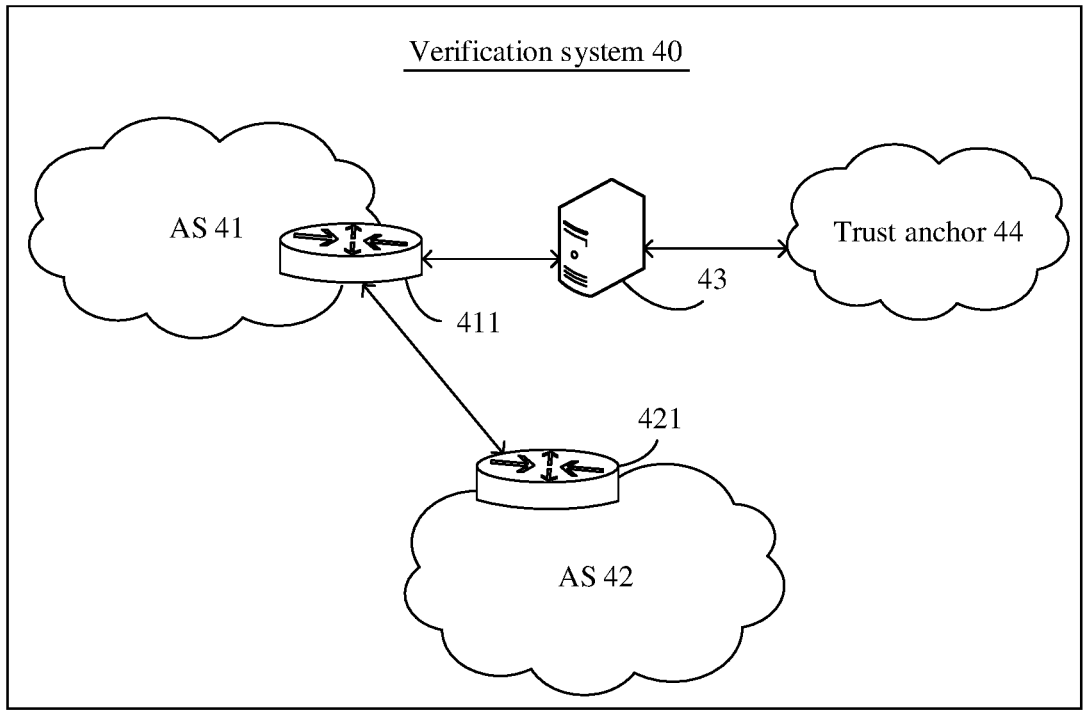
FIG. 4 is a schematic diagram of an architecture of a verification system according to an embodiment of this application.

FIG. 4 is a schematic diagram of an architecture of a verification system 40 according to an embodiment of this application.

As shown in FIG. 4, the verification system 40 includes an AS 41 and an AS 42. External BGP (external/exterior BGP, EBGP) may run between the AS 41 and the AS 42 by using a network device 411 and a network device 421, to exchange BGP routing information. The network device 411 may be a gateway device in the AS 41, and the network device 421 may be a gateway device in the AS 42. It should be understood that the verification apparatus may be applied to the network device.

The network device 411 is connected to an RPKI server 43 for communication. The RPKI server 43 communicates with a trust anchor 44, and may obtain autonomous system provider authorization (ASPA) information from the trust anchor 44.

Then, the RPKI server 43 processes the ASPA information to obtain plaintext ASPA authorization information. The RPKI server 43 may be an RPKI server specially used by the AS 41, or may be an RPKI server shared by a plurality of ASs including the AS 41 (for example, further including the AS 42). This is not limited herein.

In this way, the network device 411 may obtain the ASPA authorization information from the RPKI server 43, to generate an authorization entry database. In this case, after receiving BGP routing information sent by the network device 421, the network device 411 may verify an AS pair in AS path information in the BGP routing information based on the authorization entry database, to verify validity of an AS path indicated by the AS path information.

The following describes an AS pair verification method provided in the embodiments of this application with reference to the accompanying drawings.

Figure 5:
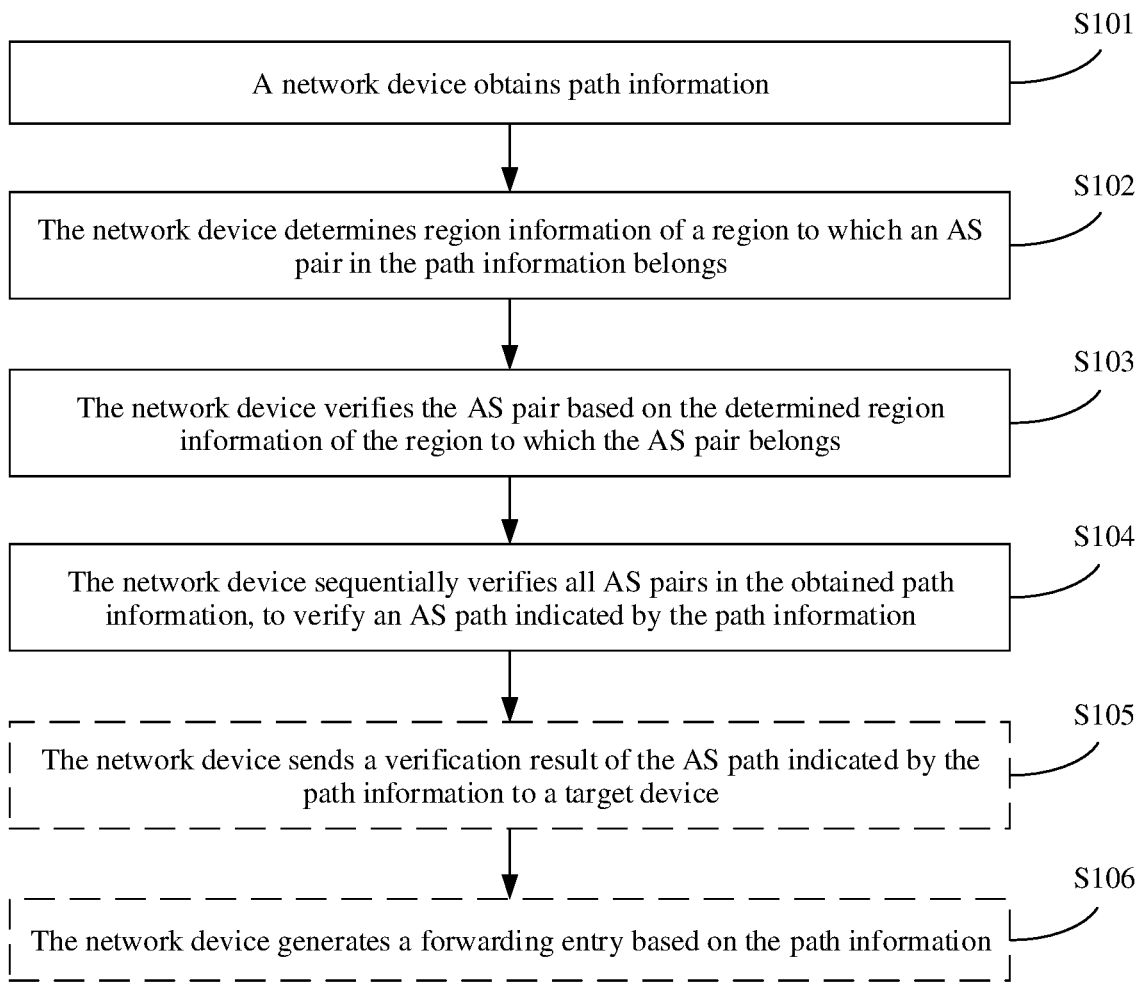
FIG. 5 is a schematic flowchart of an AS pair verification method according to an embodiment of this application.

FIG. 5 is a schematic flowchart of an AS pair verification method according to an embodiment of this application. The method may be applied to a network device in the verification system 40 shown in FIG. 4. The method may include the following steps.

S101: The network device obtains path information.

The path information is the AS path information described above. To be specific, the path information indicates one AS path, and the AS path is a path corresponding to the path information.

That is, the path information includes at least one AS pair, and any AS pair in the at least one AS pair is two adjacent AS numbers in the path information. For a related description of the AS pair, refer to the foregoing description.

Optionally, the network device may obtain the path information by obtaining a BGP update message. The BGP update message includes the path information.

In a possible implementation, after generating the BGP update message and before sending the BGP update message to a neighbor device, the network device may verify the AS pair in the path information in the BGP update message, to verify validity of the AS path indicated by the path information.

In an example, with reference to FIG. 4, if the network device is the network device 411 serving as a gateway device in the AS 41, after generating a BGP update message and before sending the BGP update message to the network device 421 serving as a gateway device in the neighbor AS 42 of the AS 41, the network device 411 may verify an AS pair in path information in the BGP update message, to verify validity of an AS path indicated by the path information.

In another possible implementation, after receiving the BGP update message sent by a neighbor device, the network device may verify the AS pair in the path information in the BGP update message, to verify validity of the AS path indicated by the path information.

In an example, with reference to FIG. 4, if the network device is the network device 411 serving as a gateway device in the AS 41, after receiving a BGP update message sent by the network device 421 serving as a gateway device in the neighbor AS 42 of the AS 41, the network device 411 may verify an AS pair in path information in the BGP update message, to verify validity of an AS path indicated by the path information.

For a description of verifying an AS pair to verify validity of an AS path indicated by path information including the AS pair, refer to the following description in S104.

S102: The network device determines region information of a region to which the AS pair in the path information belongs.

For brief description, that the network device determines region information of a region to which a first AS pair belongs is used as an example for description below. The first AS pair is any AS pair in the at least one AS pair in the path information obtained in S101.

In a possible implementation, routing information including the path information includes the region information of the region to which the first AS pair belongs. In this case, the network device may determine, from the routing information including the path information, the region information of the region to which the first AS pair belongs.

Optionally, for a network device 1 that receives the routing information (for example, BGP routing information), the network device 1 may add geographical location information of the network device 1 to path attribute information in the BGP routing information. Then, the network device 1 may send, to a neighbor device, BGP routing information to which the geographical location information of the network device 1 is added.

If the neighbor device is a network device in an AS neighbor to an AS in which the network device 1 is located, the network device 1 further adds an AS number (for example, an ASN 1) of the AS in which the network device 1 is located to the path information in the BGP routing information.

In this case, if the neighbor device is the network device described in this embodiment, after the network device described in this embodiment receives the BGP routing information to which the network device 1 adds the geographical location information of the network device 1, the network device can determine, based on the geographical location information added by the network device 1, the region information that is of the region to which the first AS pair belongs and that is included in the BGP routing information including the ASN 1.

For example, the network device 1 may add the geographical location information to received BGP routing information 1, where the geographical location information is specifically as follows:

AS path:3356 4809 9392

286:4990 (Europe)

"286" is the AS number of the AS (for example, an AS 1) in which the network device 1 is located. The geographical location information of the network device 1 that is added by the network device 1 to the path attribute information in the BGP routing information 1 may be "4990 (Europe)", to mark a geographical location of the network device 1 as "Europe", where "4990" is an identification number for "Europe".

If the neighbor AS of the AS in which the network device is located is an AS 2, when the network device 1 needs to send the received BGP routing information 1 to a network device 2 in the AS 2, the network device 1 further needs to add the AS number "286" of the AS 1 to the path information in the BGP routing information 1. That is, the AS path is changed to "AS path: 286 3356 4809 9392".

In this case, when the network device described in this embodiment is the network device 2, after the network device described in this embodiment receives the BGP routing information 1 sent by the network device 1, the region information of the region to which the first AS pair (that is, an AS pair 3356:286) including the AS number 286 belongs in the BGP routing information 1 is the geographical location information "4990 (Europe)" added by the network device 1 to the BGP routing information 1, in other words, the region information of the region to which the AS pair 3356:286 belongs is "Europe", where 3356 is an AS number of another neighbor AS (for example, an AS 3) of the AS in which the network device 1 is located.

In another possible implementation, routing information including the path information includes a prefix. The prefix usually includes an IP address segment and a mask. This is not limited in embodiments of the present disclosure. In this way, the network device may detect, based on any IP address covered by the prefix, a geographical location passed through before the IP address is reached, to determine the region information of the region to which the AS pair in the path information belongs.

In an example, path information 1 is specifically as follows:
"as_path": "4809 58879 132813"
"prefix": "45.195.52.0/22"

The path information 1 is (4809, 58879, 132813), and the prefix in the path information 1 is 45.195.52.0/22. In this case, the network device may perform traceroute detection based on an IP address (for example, 45.195.52.1) covered by the prefix, and obtain a returned traceroute result.

For example, the traceroute result indicates that the following network nodes are passed through before 45.195.52.1 is reached: one or more network nodes in an AS with an AS number 4809 in a region 1, one or more network nodes in an AS with an AS number 58879 in the region 1 and a region 2, and one or more network nodes in an AS with an AS number 132813 in the region 2.

In this case, the network device may determine that region information of a region to which an AS pair 132813:58879 in the path information belongs is the region 2, and region information of a region to which an AS pair 58879:4809 in the path information belongs is the region 1.

Certainly, the foregoing possible implementations of determining the region information of the region to which the first AS pair belongs are merely used as examples for description. A specific implementation of determining the region information of the region to which the first AS pair belongs is not limited in embodiments of this application.

S103: The network device verifies the AS pair based on the determined region information of the region to which the AS pair belongs.

For brief description, that the network device verifies the first AS pair based on the determined region information of the region to which the first AS pair belongs is used as an example for description.

Specifically, the network device verifies the first AS pair based on the determined region information of the region to which the first AS pair belongs (in this embodiment, the "region information of the region to which the first AS pair belongs" is briefly referred to as "first region information" below) and an authorization entry database.

The authorization entry database may be preset by the network device, or may be obtained by the network device from a server before the network device verifies the AS pair in the path information. This is not limited in embodiments of the present disclosure.

The authorization entry database includes at least one authorization entry.

For a first authorization entry in the at least one authorization entry, the first authorization entry includes at least one AS pair having a preset business relationship. The preset business relationship may be any one of the C2P relationship, the P2C relationship, the P2P relationship, or the S2S relationship described above.

For ease of description, that the preset business relationship is the C2P relationship is used as an example for description below in this embodiment. In this case, the first authorization entry includes at least one C2P AS pair. In other words, all AS pairs in the authorization entry database are C2P AS pairs.

It should be understood that for the at least one C2P AS pair in the first authorization entry, the at least one C2P AS pair includes a same customer AS number (for example, an ASN 1 of an AS 1). To be specific, ASs indicated by the customer AS number include at least one provider AS.

For example, as shown in Table 1, one table row shown in Table 1 represents one authorization entry.

An authorization entry 1 may include an AS pair (that is, ASN 1:ASN 2) including an AS number (that is, the ASN 1) of a customer AS 1 and an AS number (that is, the ASN 2) of a provider AS 2.

An authorization entry 2 may include an AS pair (that is, ASN 3:ASN 4) including an AS number (that is, the ASN 3) of a customer AS 3 and an AS number (the ASN 4) of a provider AS 4, and an AS pair (that is, ASN 3:ASN 5) including the AS number (that is, the ASN 3) of the customer AS 3 and an AS number (the ASN 5) of a provider AS 5.

It can be learned that the customer AS 3 has two provider ASs (that is, the provider AS 4 and the provider AS 5).

Details are shown in Table 1:

TABLE 1

| Customer ASN | Provider ASN |
| --- | --- |
| ASN 1 | ASN 2 |
| ASN 3 | ASN 4, ASN 5 |

It should be noted that the first authorization entry further includes a region identifier of a region to which the at least one C2P AS pair belongs.

The region to which the at least one C2P AS pair belongs is a geographical region in which the at least one C2P AS pair is located. The region identifier uniquely identifies the geographical region in which the at least one C2PAS pair is located.

In a second example, with reference to Table 1, as shown in Table 2, Table 2 schematically shows an authorization entry 1 and an authorization entry 2 each including a region identifier of a region to which an AS pair belongs.

A region to which one C2P AS pair included in the authorization entry 1 belongs has a region identifier 1, and a region to which two C2P AS pairs included in the authorization entry 2 belongs has a region identifier 2.

Details are shown in Table 2:

TABLE 2

| Customer ASN | Provider ASN | Region identifier |
|---|---|---|
| ASN 1 | ASN 2 | Region identifier 1 |
| ASN 3 | ASN 4, ASN 5 | Region identifier 2 |

It may be understood that business relationships between a same AS pair in different regions may all be C2P relationships. Therefore, the authorization entry database may include a plurality of authorization entries that include a same AS pair and different region identifiers.

In a third example, if an AS pair (ASN 1:ASN 2) shown in Table 2 is located in a region having a region identifier 3, and also has a C2P relationship, the authorization entry database further includes one authorization entry that includes the AS pair (ASN 1:ASN 2) and the region identifier 3.

Details are shown in Table 3:

TABLE 3

| Customer ASN | Provider ASN | Region identifier |
|---|---|---|
| ASN 1 | ASN 2 | Region identifier 1 |
| ASN 3 | ASN 4, ASN 5 | Region identifier 2 |
| ASN 1 | ASN 2 | Region identifier 3 |

In a fourth example, if an AS pair (ASN 3:ASN 4) shown in Table 2 is located in a region having a region identifier 4, and also has a C2P relationship, the authorization entry database further includes one authorization entry that includes the AS pair (ASN 3:ASN 4) and the region identifier 4.

Details are shown in Table 4:

TABLE 4

| Customer ASN | Provider ASN | Region identifier |
|---|---|---|
| ASN 1 | ASN 2 | Region identifier 1 |
| ASN 3 | ASN 4, ASN 5 | Region identifier 2 |
| ASN 3 | ASN 4 | Region identifier 4 |

It should be further understood that for at least one AS pair including a same customer ASN, if business relationships between the at least one AS pair in all regions are C2P relationships, a region identifier in an authorization entry that includes the at least one C2P AS pair may be empty.

In a fifth example, if AS pairs (ASN 3:ASN 4) and (ASN 3:ASN 5) shown in Table 2 have C2P relationships in all regions, the authorization entry database includes an authorization entry that includes (ASN 3:ASN 4) and (ASN 3:ASN 5) and in which a region identifier may be empty.

Details are shown in Table 5:

TABLE 5

| Customer ASN | Provider ASN | Region identifier |
|---|---|---|
| ASN 1 | ASN 2 | Region identifier 1 |
| ASN 3 | ASN 4, ASN 5 | |

Optionally, the authorization entry database may include at least one of a first authorization entry database and a second authorization entry database.

For clear description, that the authorization entry database includes the first authorization entry database and the second authorization entry database is used as an example for specific description below in the present disclosure.

The first authorization entry database may be an authorization entry database generated based on ASPA authorization information obtained by the server. The ASPA authorization information may be obtained by the server from a trust anchor of a regional internet registry (RIR) (for example, there are five RIRs: the Asia-Pacific RIR, the American RIR, the RIPE RIR, the Latin American and Caribbean RIR, and the African RIR).

For a specific description of generating the first authorization entry database, refer to a description in S201 to S203 below.

The second authorization entry database may be an authorization entry database generated based on a network routing table and/or network data disclosed on a network. For a specific description of generating the second authorization entry database, refer to a description in S301 and S302 below.

It should be understood that the first authorization entry database may include a first authorization entry subdatabase and a second authorization entry subdatabase. For any AS pair in any authorization entry in the first authorization entry subdatabase, IP addresses used by a pair of ASs identified by the any AS pair are internet protocol version 4 (IPv4) IP addresses.

For any AS pair in any authorization entry in the second authorization entry subdatabase, IP addresses used by a pair of ASs identified by the any AS pair are internet protocol version 6 (IPv6) IP addresses.

Similarly, the second authorization entry database may include a third authorization entry subdatabase and a fourth authorization entry subdatabase. For any AS pair in any authorization entry in the third authorization entry subdatabase, IP addresses used by a pair of ASs identified by the any AS pair are IPv4 IP addresses.

For any AS pair in any authorization entry in the fourth authorization entry subdatabase, IP addresses used by a pair of ASs identified by the any AS pair are IPv6 IP addresses.

Therefore, the network device can verify the AS pair in the path information based on the first region information, the first authorization entry database, and the second authorization entry database.

In a possible implementation, the network device may first verify the first AS pair based on the first region information and the first authorization entry database. When the first AS pair fails to be verified, the network device may re-verify the first AS pair based on the first region information and the second authorization entry database.

Specifically, when the network device first verifies the first AS pair based on the first region information and the first authorization entry database, the network device may determine, based on the prefix in the obtained path information, an authorization entry subdatabase used to verify the AS pair in the path information.

It is easily understood that, if the IP address segment in the prefix in the obtained path information is an IPv4 address segment, the authorization entry subdatabase used to verify the first AS pair is the first authorization entry subdatabase; or if the IP address segment in the prefix in the path information is an IPv6 address segment, the authorization entry database used to verify the first AS pair is the second authorization entry subdatabase.

For example, the IP address segment in the prefix in the path information is the IPv4 address segment. In this case, the authorization entry database used to verify the first AS pair is the first authorization entry sub-database (in this case, an authorization entry in the first authorization entry sub-database corresponds to a target authorization entry in the embodiments of this application).

Then, based on the first region information, the network device may determine whether the first authorization entry subdatabase includes an authorization entry that includes the first AS pair and a region identifier corresponding to the first region information, or determine whether the first authorization entry subdatabase includes an authorization entry that includes the first AS pair and in which a region identifier item is empty, to determine whether the first AS pair is successfully verified.

Specifically, if the network device determines that the first authorization entry subdatabase includes the authorization entry that includes the first AS pair and the region identifier corresponding to the first region information, the network device determines that the first AS pair is successfully verified.

If the network device determines that the first authorization entry subdatabase does not include the authorization entry that includes the first AS pair and the region identifier corresponding to the first region information, the network device determines that the first AS pair fails to be verified.

Optionally, the network device may first traverse the first authorization entry subdatabase, to determine whether the first authorization entry subdatabase includes the first AS pair.

Therefore, when the first authorization entry subdatabase includes the first AS pair, the network device may further determine whether a region identifier item in an authorization entry that includes the first AS pair in the first authorization entry subdatabase is empty. It can be learned from the foregoing content that, if a region identifier item is empty, an AS pair in an authorization entry that includes the region identifier has a same business relationship in all regions.

Therefore, if the region identifier item is empty, the network device determines that the first authorization entry subdatabase includes the authorization entry that includes the first AS pair and the region identifier corresponding to the first region information, that is, determines that the first AS pair is successfully verified.

In a possible implementation, if the region identifier item is not empty, the network device may determine, according to the preset rule, a geographical region corresponding to a region identifier in the region identifier item, and further determine whether the geographical region is the same as a geographical region indicated by the first region information.

If the geographical region is the same as the geographical region indicated by the first region information, the network device determines that the first authorization entry subdatabase includes the authorization entry that includes the first AS pair and the region identifier corresponding to the first region information. If the geographical region is different from the geographical region indicated by the first region information, the network device determines that the first authorization entry subdatabase does not include the authorization entry that includes the first AS pair and the region identifier corresponding to the first region information, that is, determines that the first AS pair fails to be verified.

In another possible implementation, if the region identifier item is not empty, the network device may further determine, based on a first region identifier that is predetermined according to the preset rule and that corresponds to the first region information, whether a region identifier in the region identifier item in the authorization entry that includes the first AS pair in the first authorization entry subdatabase is the first region identifier.

If the region identifier in the region identifier item is the first region identifier, the network device determines that the first authorization entry subdatabase includes the authorization entry that includes the first AS pair and the region identifier corresponding to the first region information. If the region identifier in the region identifier item is not the first region identifier, the network device determines that the first authorization entry subdatabase does not include the authorization entry that includes the first AS pair and the region identifier corresponding to the first region information, that is, determines that the first AS pair fails to be verified.

When the first AS pair fails to be verified, the network device may re-verify the first AS pair based on the first region information and the second authorization entry database.

Specifically, when the IP address segment in the prefix in the obtained path information is the IPv4 address segment, the network device may verify the first AS pair based on the first region information and the third authorization entry subdatabase in the second authorization entry database.

For a process in which the network device verifies the first AS pair based on the first region information and the third authorization entry subdatabase, refer to the foregoing description of the process in which the network device verifies the first AS pair based on the first region information and the first authorization entry subdatabase.

In another possible implementation, the network device may verify the first AS pair based on the first region information and a third authorization entry database. The third authorization entry database is an authorization entry database obtained by combining the first authorization entry database and the second authorization entry database.

It may be understood that the third authorization entry database includes a fifth authorization entry subdatabase and a sixth authorization entry subdatabase. For any AS pair in any authorization entry in the fifth authorization entry subdatabase, IP addresses used by a pair of ASs identified by the any AS pair are IPv4 IP addresses.

Optionally, the fifth authorization entry subdatabase may be obtained by combining the first authorization entry subdatabase and the third authorization entry subdatabase. This is not limited herein.

For any AS pair in any authorization entry in the sixth authorization entry subdatabase, IP addresses used by a pair of ASs identified by the any AS pair are IPv6 IP addresses.

Optionally, the sixth authorization entry subdatabase may be obtained by combining the second authorization entry subdatabase and the fourth authorization entry subdatabase. This is not limited herein.

Therefore, when the IP address segment in the prefix in the obtained path information is an IPv4 address segment, the network device may verify the first AS pair based on the first region information and the fifth authorization entry subdatabase in the third authorization entry database.

For a process in which the network device verifies the first AS pair based on the first region information and the fifth authorization entry subdatabase, refer to the foregoing description of the process in which the network device verifies the first AS pair based on the first region information and the first authorization entry subdatabase.

S104: The network device sequentially verifies all AS pairs in the obtained path information, to verify the AS path indicated by the path information.

Specifically, the network device may sequentially verify all the AS pairs in the obtained path information, and verify, according to the valley free principle described above, validity of the AS path indicated by the path information.

For a description of the valley free principle, refer to the foregoing description.

It can be learned from the foregoing descriptions that the at least one AS pair included in the path information is arranged in a first preset order, and the first preset order corresponds to an order of ASs that are passed through in the AS path indicated by the path information.

Therefore, the network device may sequentially verify all the AS pairs in the obtained path information in the first preset order, and verify, according to the valley free principle described above, the validity of the AS path indicated by the path information.

In an example, with reference to FIG. 1, that the path information is the path information of the AS path 1 shown in FIG. 1 is used as an example for description.

For the AS path 1 (ASN 5, ASN 4, ASN 3, ASN 2, ASN 1), the network device may sequentially verify all AS pairs in the path information of the AS path 1 starting from the AS pair including the start AS in the AS path 1. To be specific, the network device may verify all the AS pairs in the path information of the AS path 1 in an order of ASN 1:ASN 2→ASN 2:ASN 3→ASN 3:ASN 4→ASN 4:ASN 5.

Certainly, the network device may alternatively sequentially verify all the AS pairs in the path information of the AS path 1 starting from the AS pair including the end AS in the AS path 1. To be specific, the network device may verify all the AS pairs in the path information of the AS path 1 in an order of ASN 4:ASN 5→ASN 3:ASN 4→ASN 2:ASN 3→ASN 1:ASN 2. This is not limited herein.

It should be understood that, when each AS pair in the path information is verified according to the valley free principle described above and the authorization entry database that includes only the C2P AS pair, if the path information includes at most one AS pair that fails be verified, it may be determined that the AS path indicated by the path information is successfully verified, in other words, the AS path is valid. If the path information includes at least two AS pairs that fail to be verified, it may be determined that the AS path indicated by the path information fails to be verified, in other words, the AS path is invalid.

It should be understood that, when the AS pair in the path information fails to be verified for the first time, the network device may reverse an AS pair that has not been verified in the path information. For any AS pair that has not been verified, the network device may exchange two AS numbers in the AS pair, to reverse the AS pair. In this way, a business relationship between the AS pair can be inverted.

For example, for an AS pair ASN 1:ASN 2 having a C2P relationship, after the AS numbers in the AS pair are exchanged, a reversed AS pair ASN 2:ASN 1 is obtained, and a business relationship of the reversed AS pair is a P2C relationship.

In this way, the network device can verify the P2C AS pair in the path information based on the authorization entry database that includes only the C2P AS pair. It may be understood that after a P2C AS pair is reversed, a C2P AS pair is obtained.

In an example, with reference to FIG. 1, that the path information is the path information of the AS path 1 shown in FIG. 1, and the network device verifies all the AS pairs in the path information of the AS path 1 in an order of ASN 1:ASN 2→ASN 2:ASN 3→ASN 3:ASN 4→ASN 4:ASN 5 is used as an example for description.

The network device may sequentially verify all the AS pairs in the path information of the AS path 1 based on the method described in S102 and S103. The network device succeeds in verifying the AS pairs ASN 1:ASN 2 and ASN 2:ASN 3, but fails to verify the AS pair ASN 3:ASN 4. In other words, the network device fails to verify the AS pairs for the first time during verification of the AS path 1.

In this case, the network device may reverse the AS pair ASN 4:ASN 5 that has not been verified in the path information of the AS path 1, that is, reverse the AS pair ASN 4:ASN 5 to ASN 5:ASN 4. Then, the network device continues to verify the AS pair ASN 5:ASN 4 by using the method described in S102 and S103.

If the AS pair ASN 5:ASN 4 is successfully verified, it indicates that the path information of the AS path 1 includes one AS pair that fails to be verified (that is, the AS pair ASN 3:ASN 4 that fails to be verified). In this case, it is considered that AS path 1 is successfully verified, in other words, the AS path 1 is valid. If the AS pair ASN 5:ASN 4 fails to be verified, it indicates that the path information of the AS path 1 includes two AS pairs that fail to be verified (to be specific, the AS pairs ASN 3:ASN 4 and ASN 4:ASN 5 (or ASN 5:ASN 4) fail to be verified). In this case, it is considered that the AS path 1 fails to be verified, in other words, the AS path 1 is invalid.

S105 (optional): The network device sends a verification result of the AS path indicated by the path information to a target device.

The target device may be a device that is in an AS (corresponding to the first AS in the embodiments of this application) to which the network device belongs and that is connected to the network device for communication. The target device may exchange BGP routing information with the network device by running internal BGP (internal/interior BGP, IBGP).

After completing verification of the AS path indicated by the path information, the network device may send the path information and the verification result to the target device.

In response to this, the target device may receive the path information and the verification result. Therefore, after receiving the BGP update message including the path information, the target device may process the path information based on the verification result, without verifying the path information. This reduces used resources of the target device, and improves efficiency of the target device.

S106 (optional): The network device generates a forwarding entry based on the path information.

When the network device succeeds in verifying the AS path indicated by the path information, it indicates that no route leak occurs on the path information, in other words, the AS path indicated by the path information is valid.

In this case, the network device may generate a first forwarding entry based on the path information, and use the first forwarding entry as a forwarding entry with a highest priority, to forward a message.

When the network device fails to verify the AS path indicated by the path information, it indicates that a route leak may occur on the path information, in other words, the AS path indicated by the path information is invalid.

In this case, the network device may generate a second forwarding entry based on the path information, and mark specific information for the second forwarding entry. The specific information is used to indicate whether the second forwarding entry is a high-risk forwarding entry or a low-priority forwarding entry.

A risk level or a priority level of a forwarding entry may be used to indicate a probability of leaking routing information in the forwarding entry. For example, for a forwarding entry with a high risk level (that is, a high-risk forwarding entry) or a forwarding entry with a low-priority level (that is, a low-priority forwarding entry), there is a high probability of leaking routing information in the forwarding entry. In other words, the routing information in the forwarding entry is prone to leakage.

Therefore, the network device can determine, based on the risk level or the priority level of the forwarding entry, the forwarding entry used to forward a message. The network device usually selects a secure entry to forward the message. When there is no secure forwarding entry in a candidate forwarding entry, the network device may select a low-risk forwarding entry or a high-priority forwarding entry to forward the message.

The foregoing describes the AS pair verification method provided in this embodiment. The method can effectively avoid a case in which an AS path indicated by path information is incorrectly determined because an AS pair in the path information is incorrectly determined during verification of the AS path, and effectively improve accuracy of verifying the AS path.

The following describes a method for generating a first authorization entry database and a method for generating a second authorization entry database that are provided in the embodiments of this application.

Figure 6:
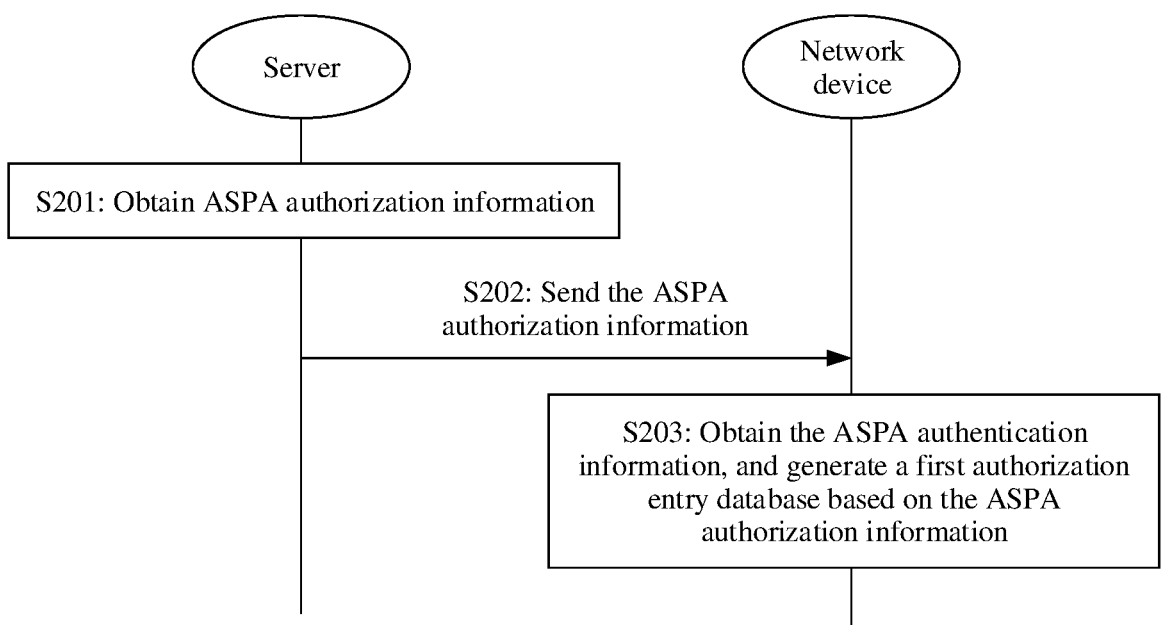
FIG. 6 is a schematic flowchart of a method for generating a first authorization entry database according to an embodiment of this application.

FIG. 6 is a schematic flowchart of a method for generating a first authorization entry database according to an embodiment of this application. The method may be applied to the verification system 40 shown in FIG. 4. The method may include the following steps.

S201: A server obtains ASPA authorization information.

The server may be an RPKI cache server. This is not limited herein.

The ASPA authorization information includes an AS pair having a preset business relationship, and a region identifier of a region to which the AS pair belongs.

Herein, for a description of the AS pair having the preset business relationship, refer to the foregoing description of the AS pair having the preset business relationship.

The region identifier may be used to uniquely identify a geographical region. Therefore, the region identifier of the region to which the AS pair belongs is used to uniquely identify a geographical region in which the AS pair is located. An area of the geographical region is not specifically limited in this embodiment.

For example, the geographical region may be a geographical region obtained through division by continent, may be a geographical region obtained through division by country, or may be a geographical region obtained through division by province. This is not limited herein.

For different geographical regions, unique identity documents (identity document, ID) may be used as region identifiers corresponding to the geographical regions. The IDs used to identify the different geographical regions may be determined according to a preset rule. The preset rule is not specifically limited in embodiments of this application.

Optionally, the preset rule may be to identify the different geographical regions by using predefined IDs.

For example, a geographical region 1 may be identified by using a predefined ID 1, and a geographical region 2 may be identified by using a predefined ID 2.

Optionally, the preset rule may alternatively be to identify the different geographical regions by using IDs determined according to a preset coding rule. The preset coding rule is not specifically limited in embodiments of this application.

For example, an ID used to identify the geographical region obtained through division by continent may be obtained by coding a 5-bit binary number in ascending order according to a coding rule.

As shown in Table 6, a region identifier corresponding to Africa may be 00001 (that is, 1), a region identifier corresponding to Oceania may be 00010 (that is, 2), a region identifier corresponding to Asia may be 00011 (that is, 3), a region identifier corresponding to *Antarctica* may be 00100 (that is, 4), a region identifier corresponding to Europe may be 00101 (that is, 5), a region identifier corresponding to Latin America/Caribbean Islands may be 00110 (that is, 6), a region identifier corresponding to North America may be 00111 (that is, 7), and a region identifier corresponding to a reserved region may range from 01000 to 11111 (that is, 8 to 31).

Details are shown in Table 6:

TABLE 6

| Geographical region | Region identifier |
|---|---|
| Africa (AF) | 00001 |
| Oceania (OC) | 00010 |
| Asia (AS) | 00011 |
| Antarctica (AQ) | 00100 |
| Europe (EU) | 00101 |
| Latin America/Caribbean Islands (LAC) | 00110 |
| North America (NA) | 00111 |
| Reserved region | 01000 to 11111 |

In a possible implementation, the server may obtain the ASPA authorization information from a trust anchor.

Specifically, a function of the trust anchor may be implemented by any computer device having a computing processing capability. A specific form of a device implementing the function of the trust anchor is not limited in embodiments of this application.

The trust anchor may be a trust anchor of an RIR. For example, for the Asia-Pacific RIR, a trust anchor may be a trust anchor 1. For another example, for the American RIR, a trust anchor may be a trust anchor 2.

Specifically, a user having an AS number (which is briefly referred to as an AS user for short) may report ASPA information of the AS user to a trust anchor of an RIR corresponding to a region in which the AS user is located. In this way, the trust anchor of the RIR can obtain ASPA authorization information of the AS user.

Optionally, the AS user may register the ASPA information on an RIR website corresponding to the region in which the AS user is located, so that the trust anchor of the RIR determines the ASPA authorization information based on the ASPA information.

It can be learned from the foregoing description that an authorization entry database may include only a C2P AS pair. Therefore, when an AS user registers ASPA information on an RIR website corresponding to a region in which the AS user is located, only an AS user serving as a customer needs to register ASPA information on an RIR website corresponding to a region in which the AS user is located.

The following provides a description by using an example that an AS user serving as a customer registers ASPA information on an RIR website corresponding to a region in which the AS user is located.

Figure 7A:
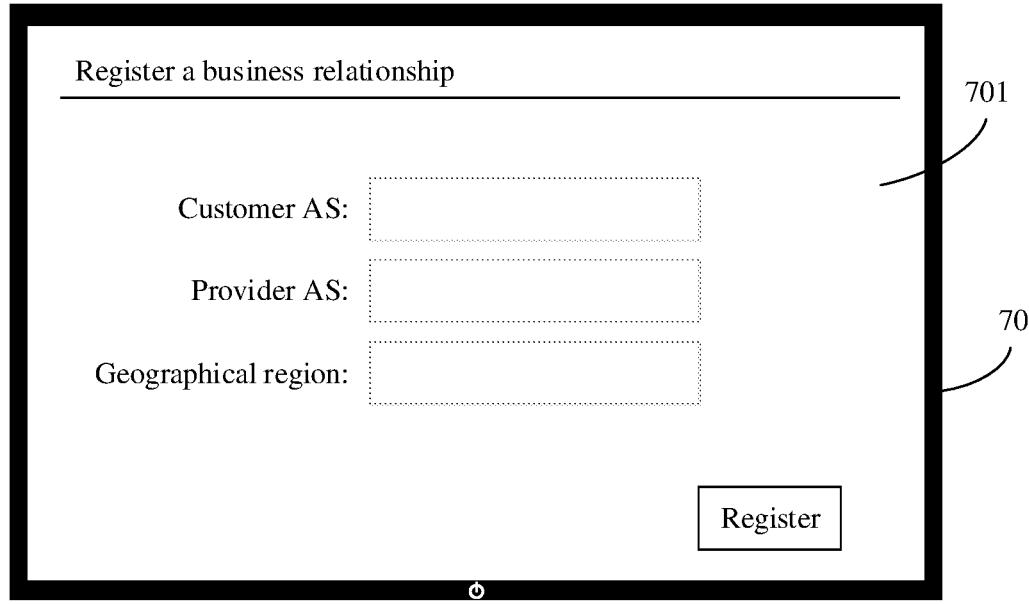
FIG. 7(a) and FIG. 7(b) are schematic diagrams of registering ASPA information by an AS user on an RIR website according to an embodiment of this application.
Figure 7B:
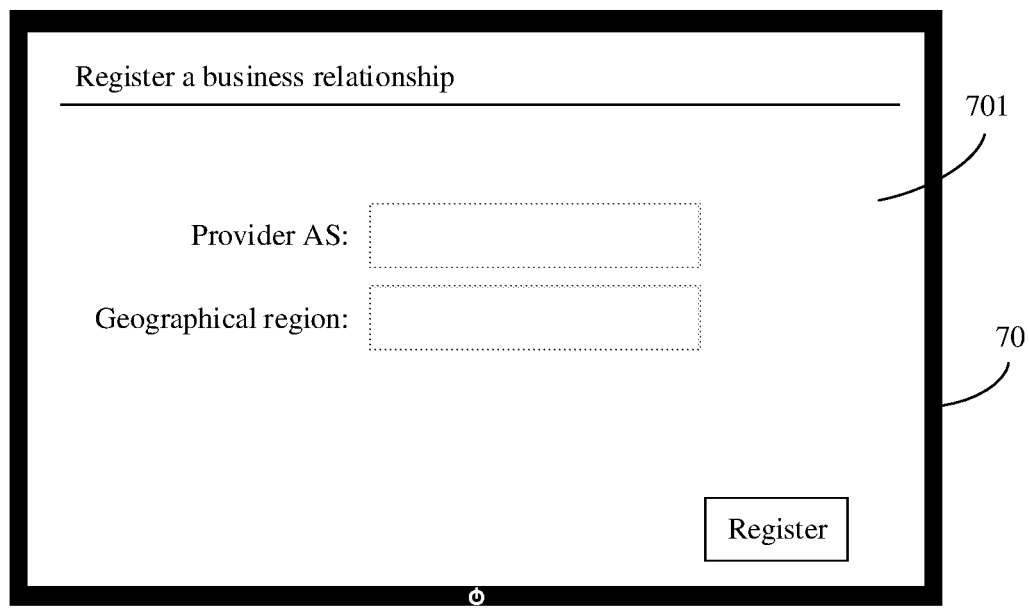

For example, FIG. 7(a) and FIG. 7(b) are schematic diagrams of registering ASPA information by an AS user on an RIR website.

As shown in FIG. 7(a), the AS user may first log in to the RIR website by using a pre-registered account and password through an RIR website login interface on a display 70.

Then, in a "Register a business relationship" interface 701 of the RIR website displayed on the display 70, the AS user may enter an AS number of an AS serving as a customer in a "Customer AS" box, enter an AS number of an AS serving as a provider of the customer AS in a "Provider AS" box, and enter, in a "Geographical region" box, a geographical region in which an AS pair including the AS number of the customer AS and the AS number of the provider AS is located.

It should be understood that there is only one AS number in the "Customer AS" box, but there may be a plurality of AS numbers in the "Provider AS" box. In other words, one customer AS may correspond to a plurality of provider ASs. This is not limited herein.

Then, the AS user taps a "Register" button in the interface 701, to submit the ASPA information entered in the interface "701" to an RIR.

In this way, a trust anchor of the RIR can receive the ASPA information submitted by the AS user, and determine at least one C2P AS pair based on the ASPA information. The trust anchor of the RIR may further determine, based on the geographical region in which the at least one C2P AS pair is located and according to the foregoing preset rule, a region identifier of the region to which the at least one C2P AS pair belongs. In this way, the trust anchor of the RIR obtains ASPA authorization information of the AS user based on the ASPA information submitted by the AS user.

It can be learned that, based on the example described in FIG. 7(a), the AS user can register the ASPA information of the AS user on the RIR website, namely, enter the AS number of the AS user in the "Customer AS" box in FIG. 7(a). Alternatively, known ASPA information of another AS user may be registered on the RIR website. To be specific, an AS number of another AS is entered in the "Customer AS" box in FIG. 7(a). This is not limited herein.

As shown in FIG. 7(b), a "Register a business relationship" interface 701 of the RIR website displayed on a display 70 includes only a "Provider AS" box. In this case, an AS serving as a customer of the provider AS is the AS user entering the ASPA information by default.

The AS user may log in to the RIR website by using a pre-registered account and password through an RIR website login interface on the display 70. After the "Register a business relationship" interface 701 is displayed on the display 70, the AS user may enter an AS number of an AS serving as a provider of the AS user in the "Provider AS" box, and enter, in a "Geographical region" box, a geographical region in which an AS pair including the AS number of the provider AS and an AS number of the AS user is located.

It should be understood that there may be a plurality of AS numbers in the "Provider AS" box.

Then, the AS user taps a "Register" button in the interface 701, to submit the ASPA information entered in the interface "701" to an RIR.

In this way, a trust anchor of the RIR can receive the ASPA information submitted by the AS user, and determine at least one C2P AS pair based on the ASPA information. The trust anchor of the RIR may further determine, based on the geographical region in which the at least one C2P AS pair is located and according to the foregoing preset rule, a region identifier of the region to which the at least one C2P AS pair belongs. In this way, the trust anchor of the RIR obtains ASPA authorization information of the AS user based on the ASPA information submitted by the AS user.

It can be learned that, based on the example described in FIG. 7(b), the AS user can register the ASPA information of the AS user on the RIR website.

In this way, the trust anchor of the RIR may determine a plurality of pieces of ASPA authorization information based on a plurality of pieces of ASPA information registered by one or more AS users.

Then, the trust anchor of the RIR may send the determined ASPA authorization information to the server in an encryption or non-encryption manner.

Optionally, the trust anchor of the RIR may send the determined ASPA authorization information to the server in the encryption or non-encryption manner upon receiving a request of the server for obtaining the ASPA authorization information.

Optionally, the trust anchor of the RIR may actively send the determined ASPA authorization information to the server in the encryption or non-encryption manner.

Optionally, the trust anchor of the RIR may actively send the determined ASPA authorization information to the server in the encryption or non-encryption manner based on a preset period. This is not limited herein.

In response to this, the server receives the ASPA authorization information sent by the trust anchor of the RIR, namely, obtains the ASPA authorization information.

In another possible implementation, the server obtains at least one piece of ASPA authorization information determined based on a network routing table and/or network data disclosed on a network.

Optionally, the server may receive the at least one piece of ASPA authorization information sent by a network device. The at least one piece of ASPA authorization information may be at least one piece of ASPA authorization information determined by the network device based on the network routing table and/or the network data disclosed on and obtained from the network.

The network routing table and/or the network data disclosed on the network include/includes an AS pair having a preset business relationship and region information of a region to which the AS pair belongs. In this way, the network device can determine the at least one piece of ASPA authorization information based on the network routing table and/or the network data.

For example, the network device may extract at least one AS pair in the network routing table and/or the network data by using a route processing tool, and analyze a business relationship between the at least one AS pair. Then, the network device may determine, from the at least one AS pair, at least one AS pair having the preset business relationship.

Then, the network device may determine, based on a context or prefix of the network routing table and/or the network data, region information of a geographical location of the at least one AS pair having the preset business relationship. Certainly, the network routing table and/or the network data may also include the region information corresponding to the at least one AS pair having the preset business relationship. This is not limited herein.

Then, the network device may determine, based on the region information corresponding to the at least one AS pair having the preset business relationship and according to the foregoing preset rule, a region identifier corresponding to the at least one AS pair having the preset business relationship. In this way, the network device determines the at least one piece of ASPA authorization information based on the network routing table and/or the network data disclosed on the network.

Optionally, the server may further directly obtain, from the network, the network routing table and/or the network data disclosed on the network, and determine the at least one piece of ASPA authorization information.

For a process in which the server determines the at least one piece of ASPA authorization information based on the network routing table and/or the network data disclosed on the network, refer to the foregoing description of determining, by the network device, the at least one piece of ASPA authorization information based on the network routing table and/or the network data disclosed on the network.

S202: The server sends the ASPA authorization information to the network device.

The network device may be a network device that performs the foregoing AS pair verification method, or may be any other network device that has a computing processing capability. This is not limited herein.

Optionally, the server may first generate at least one protocol data unit (PDU) message based on the obtained at least one piece of ASPA authorization information. Then, the server sends the at least one PDU message to the network device.

It should be understood that one piece of ASPA authorization information corresponds to one PDU message. To be specific, one PDU message includes at least one AS pair having the preset business relationship, and includes a region identifier of a region to which the at least one AS pair having the preset business relationship belongs. Herein, for a description of the AS pair having the preset business relationship, refer to the foregoing description of the AS pair having the preset business relationship.

For example, the preset business relationship is a C2P relationship. In this case, one PDU message includes one AS number of one AS serving as a customer, at least one AS number of at least one AS serving as a provider, and a region identifier of a region to which at least one C2P AS pair including the customer AS number and the at least one provider AS number belongs.

The following shows an example of a format of a PDU message provided in embodiments of this application.

Figure 8:
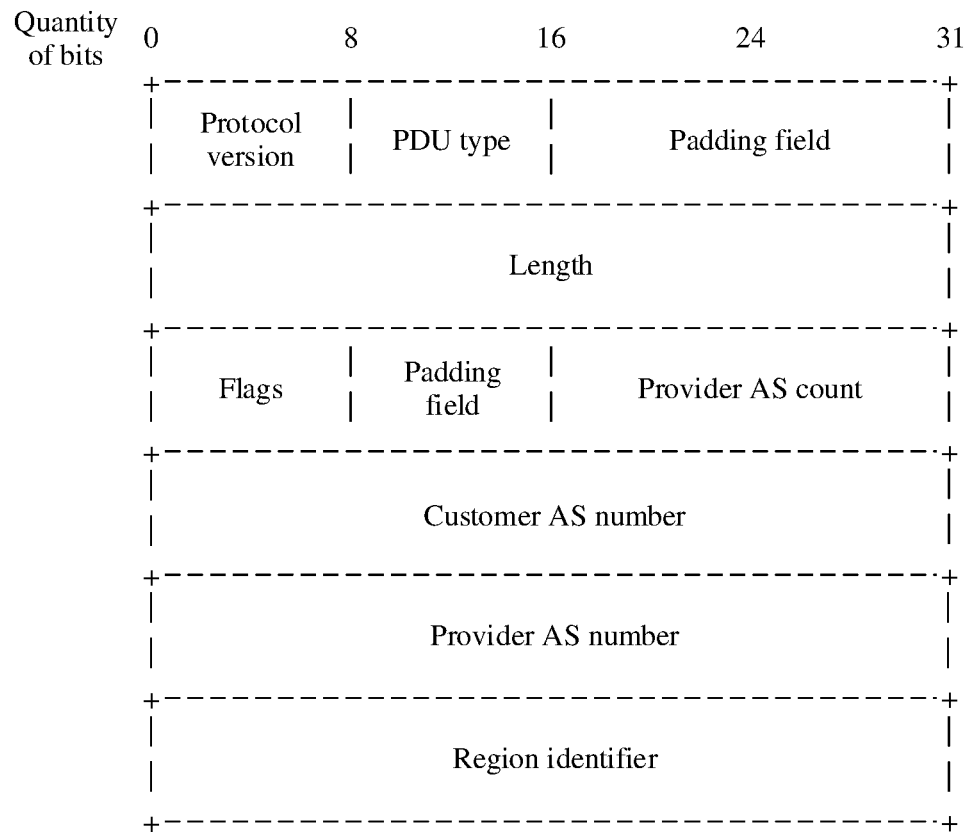
FIG. 8 is a schematic diagram of a PDU message according to an embodiment of this application.

FIG. 8 is a schematic diagram of a PDU message according to an embodiment of this application.

As shown in FIG. 8, a protocol version field is used to indicate a version number of a communication protocol used between the server and the network device, and usually occupies 1 byte, that is, 8 bits.

For example, if the version number of the communication protocol running between the server and the network device is 2.0, a value of this field is 2, that is, 00000010.

A PDU type field is used to indicate a PDU type, and usually occupies 1 byte, that is, 8 bits. For example, if a value of the PDU type is 11, a value of this field is 11, that is, 00001011.

A padding (zero) field is used to perform 4-byte alignment on the PDU message, where 4-byte alignment means that a quantity of bits is divisible by 32.

As shown in FIG. 8, the PDU message includes two zero fields, and the first zero field occupies 2 bytes, that is, 16 bits. The second zero field occupies 1 byte, that is, 8 bits.

A length field is used to indicate a length of the PDU message, and usually occupies 4 bytes, that is, 32 bits.

A flags field usually occupies 1 byte, that is, 8 bits. The bits in this field may identify different content.

For example, the first bit in the flags field may be used to indicate whether an AS pair carried in the PDU message needs to be advertised. For example, when the first bit is 0, it indicates that the AS pair carried in the PDU message is to be advertised; or when the first bit is 1, it indicates that the AS pair carried in the PDU message is to be withdrawn.

The second bit in the flags field may be used to indicate an IP version used by a pair of ASs indicated by any AS pair carried in the PDU message. For example, when the second bit is 0, it indicates that the pair of ASs indicated by the any AS pair carried in the PDU message uses an IPv4 IP address; or when the second bit is 1, it indicates that the pair of ASs indicated by the any AS pair carried in the PDU message uses an IPv6 IP address.

It should be understood that, in this case, remaining 6 bits in the flags field are reserved.

A provider AS count field is used to indicate a quantity of ASs serving as providers in AS pairs carried in the PDU message, and usually occupies 2 bytes, that is, 16 bits.

A customer AS number (customer autonomous system number) field is used to indicate an AS number of an AS serving as a customer in an AS pair carried in the PDU message, and usually occupies 4 bytes, that is, 32 bits.

A provider AS number (provider autonomous system number(s)) field is used to indicate an AS number of an AS serving as a provider in an AS pair carried in the PDU message, and usually occupies 4 bytes, that is, 32 bits.

It should be understood that the provider AS number field may include AS numbers of a plurality of ASs serving as providers, and a specific quantity is the quantity indicated in the provider AS count field.

A region identifier field is used to indicate a region identifier of a region to which a C2P AS pair carried in the PDU message belongs. As shown in FIG. 8, the field may occupy a length of 4 bytes, that is, 32 bits.

It should be understood that an actual length of the region identifier field is related to the foregoing preset rule for determining a region identifier corresponding to a geographical region. For example, when a 5-bit binary number is used to encode the region identifier, an actual length of the region identifier is 5 bits.

It may be understood that for a plurality of C2P AS pairs including a same customer AS number, the plurality of C2P AS pairs may belong to a same region or may belong to different regions. When the plurality of C2P AS pairs including the same customer AS number belong to different regions, a quantity of PDU messages carrying the plurality of C2P AS pairs is the same as a quantity of regions to which the plurality of C2P AS pairs belong.

For example, for the following five C2P AS pairs: ASN 1:ASN 2, ASN 1:ASN 3, ASN 1:ASN 4, ASN 1:ASN 5, and ASN 1:ASN 6; the C2P AS pairs ASN 1:ASN 2, ASN 1:ASN 3, and ASN 1:ASN 4 belong to a region 1 with a corresponding region identifier 1; and the C2P AS pairs ASN 1:ASN 5 and ASN 1:ASN 6 belong to a region 2 with a corresponding region identifier 2. In other words, a quantity of regions to which the five C2P AS pairs belong is 2.

In this case, the server may send the five C2P ASs and the corresponding region identifiers by using two PDU messages. For example, a PDU 1 carries the C2P AS pairs ASN 1:ASN 2, ASN 1:ASN 3, and ASN 1:ASN 4, and the region identifier 1; and a PDU 2 carries the C2P AS pairs ASN 1:ASN 5 and ASN 1:ASN 6, and the region identifier 2.

S203: The network device obtains the ASPA authorization information, and generates a first authorization entry database based on the ASPA authorization information.

Optionally, after receiving the at least one PDU message sent by the server, the network device may obtain the ASPA authorization information from the at least one PDU message.

Then, the network device may generate the first authorization entry database based on the obtained ASPA authorization information.

It may be understood that, when the flags field in the PDU message indicates that an IP address used by a pair of ASs indicated by any AS pair carried in the PDU message is an IPv4 IP address, the ASPA authorization information obtained by the network device from the PDU message is used to generate a first authorization entry subdatabase in the first authorization entry database.

Similarly, when the flags field in the PDU message indicates that an IP address used by a pair of ASs indicated by any AS pair carried in the PDU message is an IPv6 IP address, the ASPA authorization information obtained by the network device from the PDU message is used to generate a second authorization entry subdatabase in the first authorization entry database.

For a detailed description of the first authorization entry database, refer to the foregoing description of the authorization entry database.

It may be understood that when the ASPA authorization information obtained by the network device includes the ASPA authorization information determined based on the network routing table and/or the network data disclosed on the network, the authorization entry database in this embodiment no longer includes a second authorization entry database. In other words, the first authorization entry database is the authorization entry database described in this embodiment.

Figure 9:
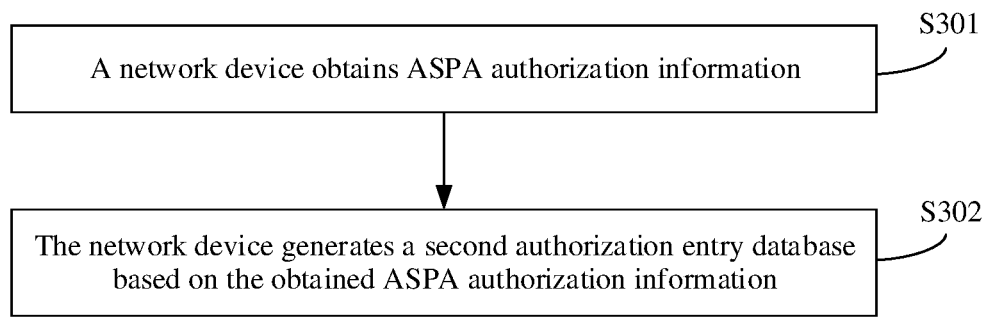
FIG. 9 is a schematic flowchart of a method for generating a second authorization entry database according to an embodiment of this application.

FIG. 9 is a schematic flowchart of a method for generating a second authorization entry database according to an embodiment of this application. The method may be applied to the verification system 40 shown in FIG. 4. The method may include the following steps.

S301: A network device obtains ASPA authorization information.

Optionally, the network device may first obtain, from a network, a network routing table and/or network data disclosed on the network, and then determine at least one piece of ASPA authorization information based on the obtained network routing table and/or network data.

For a description of determining, by the network device, the at least one piece of ASPA authorization information based on the network routing table and/or the network data disclosed on the network, refer to the foregoing related description in S201.

S302: The network device generates a second authorization entry database based on the obtained ASPA authorization information.

Specifically, the network device generates the second authorization entry database based on the obtained at least one piece of ASPA authorization information.

For first ASPA authorization information in the at least one piece of ASPA authorization information, when an IP address used by a pair of ASs indicated by any AS pair in the first ASPA authorization information is an IPv4 IP address, the first ASPA authorization information is used to generate a third authorization entry subdatabase in the second authorization entry database.

Similarly, when an IP address used by a pair of ASs indicated by any AS pair in the first ASPA authorization information is an IPv6 IP address, the first ASPA authorization information is used to generate a fourth authorization entry subdatabase in the second authorization entry database.

For a description of the second authorization entry database, refer to the foregoing description of the authorization entry database.

In conclusion, an embodiment of this application provides an AS pair verification method. In the method, a region identifier of a region to which each AS pair belongs is added to an authorization entry database used to verify the AS pair. This can avoid a case in which validity of an AS path indicated by path information in BGP routing information is incorrectly determined because a business relationship between an AS pair in the path information is incorrectly determined when the validity of the AS path is verified according to a valley free principle. Therefore, the AS pair verification method provided in this embodiment improves accuracy of verifying the AS path indicated by the path information including the AS pair.

The foregoing mainly describes, from a method perspective, the solutions provided in the embodiments of this application. To implement the foregoing functions, corresponding hardware structures and/or software modules for performing the functions are included. A person skilled in the art should easily be aware that, in combination with units and algorithm steps in the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, an AS pair verification apparatus may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, division into the modules is an example and merely logical function division, and may be other division in an actual implementation.

Figure 10:
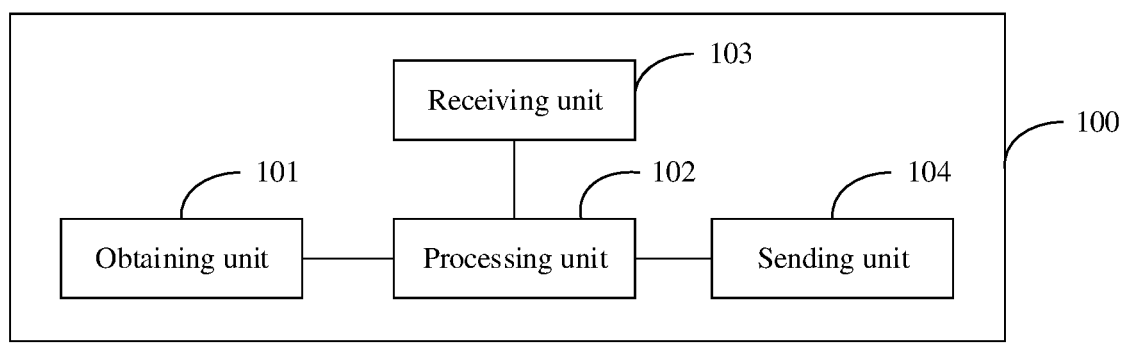
FIG. 10 is a schematic diagram of a structure of an AS pair verification apparatus 100 according to an embodiment of this application.

FIG. 10 is a schematic diagram of a structure of an AS pair verification apparatus 100 according to an embodiment of this application. The apparatus 100 may be applied to a network device, and is configured to perform the foregoing AS pair verification method, for example, configured to perform the method shown in FIG. 5. The apparatus 100 may include an obtaining unit 101 and a processing unit 102.

The obtaining unit 101 is configured to obtain path information, where the path information includes an AS pair, and the AS pair in the path information includes two adjacent AS numbers in the path information. The processing unit 102 is configured to: determine region information of a region to which the AS pair belongs, and verify the AS pair based on the region information of the region to which the AS pair belongs.

In an example, with reference to FIG. 5, the obtaining unit 101 may be configured to perform S101, and the processing unit 102 may be configured to perform S102 and S103.

Optionally, the processing unit 102 is further configured to verify the AS pair based on the determined region information of the region to which the AS pair belongs and an authorization entry database.

In an example, with reference to FIG. 5, the processing unit 102 may be configured to perform S103.

Optionally, the processing unit 102 is further configured to: when the authorization entry database includes an authorization entry that includes the AS pair and a region identifier corresponding to the region information of the region to which the AS pair belongs, determine that the AS pair is successfully verified.

In an example, with reference to FIG. 5, the processing unit 102 may be configured to perform S103.

Optionally, the processing unit 102 is further configured to: when the authorization entry database does not include an authorization entry that includes the AS pair and a region identifier corresponding to the region information of the region to which the AS pair belongs, determine that the AS pair fails to be verified.

In an example, with reference to FIG. 5, the processing unit 102 may be configured to perform S103.

Optionally, the processing unit 102 is further configured to: determine, from routing information including the path information, the region information of the region to which the AS pair belongs; or determine, based on a prefix in the routing information, the region information of the region to which the AS pair belongs.

In an example, with reference to FIG. 5, the processing unit 102 may be configured to perform S103.

Optionally, the obtaining unit 101 is further configured to obtain the authorization entry database.

In an example, with reference to FIG. 6, the obtaining unit 101 may be configured to perform S203.

Optionally, the authorization entry database includes a first authorization entry database. The apparatus 100 further includes: a receiving unit 103, configured to receive a protocol data unit (PDU) message from a server, where the PDU message includes an AS pair having a preset business relationship and a region identifier of a region to which the AS pair having the preset business relationship belongs. The processing unit 102 is further configured to generate the first authorization entry database based on the received PDU message.

In an example, with reference to FIG. 6, the receiving unit 103 and the processing unit 102 may be configured to perform S203.

Optionally, the authorization entry database further includes a second authorization entry database. The processing unit 102 is further configured to generate the second authorization entry database based on a network routing table and/or network data. The network routing table and/or the network data includes the AS pair having the preset business relationship and region information of the region to which the AS pair having the preset business relationship belongs.

In an example, with reference to FIG. 9, the processing unit 102 may be configured to perform S302.

Optionally, the processing unit 102 is further configured to: verify the AS pair based on the region information of the region to which the AS pair belongs and the first authorization entry database; and if the AS pair fails to be verified, verify the AS pair based on the region information of the region to which the AS pair belongs and the second authorization entry database.

In an example, with reference to FIG. 5, the processing unit 102 may be configured to perform S103.

Optionally, the processing unit 102 is further configured to verify the AS pair based on the region information of the region to which the AS pair belongs and a target authorization entry that is in the authorization entry database and that corresponds to the prefix in the path information, where an IP version of an AS pair in the target authorization entry is the same as an IP version in the prefix in the path information.

In an example, with reference to FIG. 5, the processing unit 102 may be configured to perform S103.

Optionally, the path information includes a plurality of AS numbers arranged in a preset order, and the plurality of AS numbers are used to indicate a path corresponding to the path information. The processing unit 102 is further configured to sequentially verify all AS pairs in the path information, to verify the path corresponding to the path information.

In an example, with reference to FIG. 5, the processing unit 102 may be configured to perform S104.

Optionally, the processing unit 102 is further configured to: when the AS pair in the path information fails to be verified for the first time, reverse an AS pair that has not been verified in the path information. The processing unit 102 is further configured to verify a reversed AS pair, to complete verification of the path corresponding to the path information.

In an example, with reference to FIG. 5, the processing unit 102 may be configured to perform S104.

Optionally, the processing unit 102 is further configured to: if the path information includes at most one AS pair that fails to be verified, determine that the path corresponding to the path information is successfully verified.

In an example, with reference to FIG. 5, the processing unit 102 may be configured to perform S104.

Optionally, the processing unit 102 is further configured to generate a first forwarding entry based on the path information.

In an example, with reference to FIG. 5, the processing unit 102 may be configured to perform S106.

Optionally, the processing unit 102 is further configured to: if the path information includes at least two AS pairs that fail to be verified, determine that the path corresponding to the path information fails to be verified.

In an example, with reference to FIG. 5, the processing unit 102 may be configured to perform S104.

Optionally, the processing unit 102 is further configured to generate a second forwarding entry based on the path information. The processing unit 102 is further configured to mark specific information for the second forwarding entry, where the specific information is used to indicate whether the second forwarding entry is a high-risk forwarding entry or a low-priority forwarding entry.

In an example, with reference to FIG. 5, the processing unit 102 may be configured to perform S106.

Optionally, the network device is a network device in a first AS. The apparatus 100 further includes: a sending unit 104, configured to send a verification result of the path corresponding to the path information to a target device. The target device is a device that is in the first AS and that is connected to the network device for communication.

In an example, with reference to FIG. 5, the sending unit 104 may be configured to perform S105.

Optionally, the obtaining unit 101 is further configured to obtain a border gateway protocol (BGP) update message, where the BGP update message includes the path information.

In an example, with reference to FIG. 5, the obtaining unit 101 may be configured to perform S101.

Optionally, the processing unit 102 is further configured to: after the BGP update message is received, verify the AS pair in the path information in the BGP update message, to verify the path corresponding to the path information. Alternatively, the processing unit 102 is configured to: before the BGP update message is sent, verify the AS pair in the path information in the BGP update message, to verify the path corresponding to the path information.

In an example, with reference to FIG. 5, the processing unit 102 may be configured to perform S103 and S104.

For specific descriptions of the optional manners, refer to the method embodiments. In addition, for any explanation of the apparatus 100 provided above and descriptions of beneficial effects, refer to the foregoing corresponding method embodiments.

In an example, with reference to FIG. 3, functions of the obtaining unit 101 and the processing unit 102 of the apparatus 100 may be implemented by using the processor 31 in FIG. 3 by executing the program code in the memory 32 in FIG. 3. Functions of the receiving unit 103 and the sending unit 104 may be implemented by using the communications interface 3 in FIG. 3.

Figure 11:
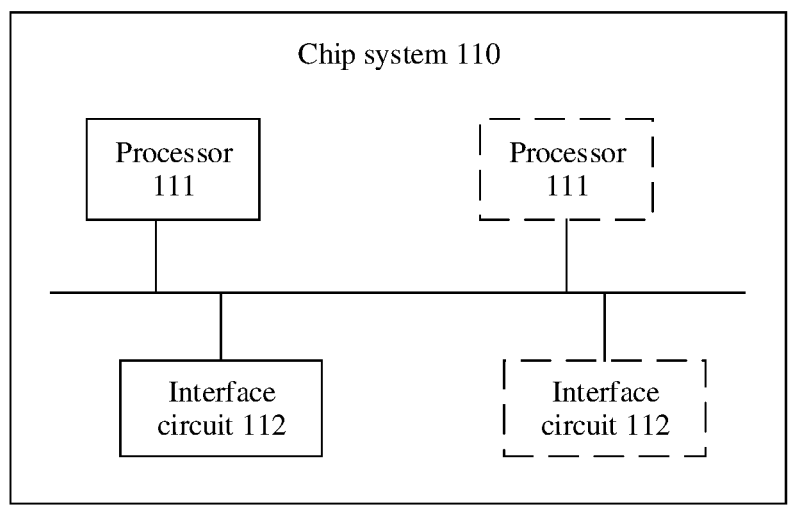
FIG. 11 is a schematic diagram of a structure of a chip system according to an embodiment of this application.

An embodiment of this application further provides a chip system 110. As shown in FIG. 11, the chip system 110 includes at least one processor and at least one interface circuit.

In an example, when the chip system 110 includes one processor and one interface circuit, the processor may be a processor 111 shown in a solid line box (or a processor 111 shown in a dashed line box) in FIG. 11, and the interface circuit may be an interface circuit 112 shown in a solid line box (or an interface circuit 112 shown in a dashed box) in FIG. 11.

When the chip system 110 includes two processors and two interface circuits, the two processors include the processor 111 shown in the solid line box and the processor 111 shown in the dashed line box in FIG. 11, and the two interface circuits include the interface circuit 112 shown in the solid line box and the interface circuit 112 shown in the dashed line box in FIG. 11. This is not limited herein.

The processor 111 and the interface circuit 112 may be connected to each other through a line. For example, the interface circuit 112 may be configured to receive a signal (for example, obtain region information of a region to which an AS pair belongs, or receive a PDU message from a server). For another example, the interface circuit 112 may be configured to send a signal to another apparatus (for example, the processor 111).

For example, the interface circuit 112 may read instructions stored in a memory, and send the instructions to the processor 111. When the instructions are executed by the processor 111, the AS pair verification apparatus is enabled to perform the steps in the foregoing embodiments. Certainly, the chip system 110 may further include another discrete device. This is not specifically limited in embodiments of this application.

Another embodiment of this application further provides a computer-readable storage medium. The computer-readable storage medium stores instructions. When the instructions are run on an AS pair verification apparatus, the AS pair verification apparatus performs the steps performed by the AS pair verification apparatus in the method procedures shown in the foregoing method embodiments.

In some embodiments, the disclosed method may be implemented as computer program instructions encoded in a machine-readable format on a computer-readable storage medium or encoded on another non-transitory medium or product.

Figure 12:
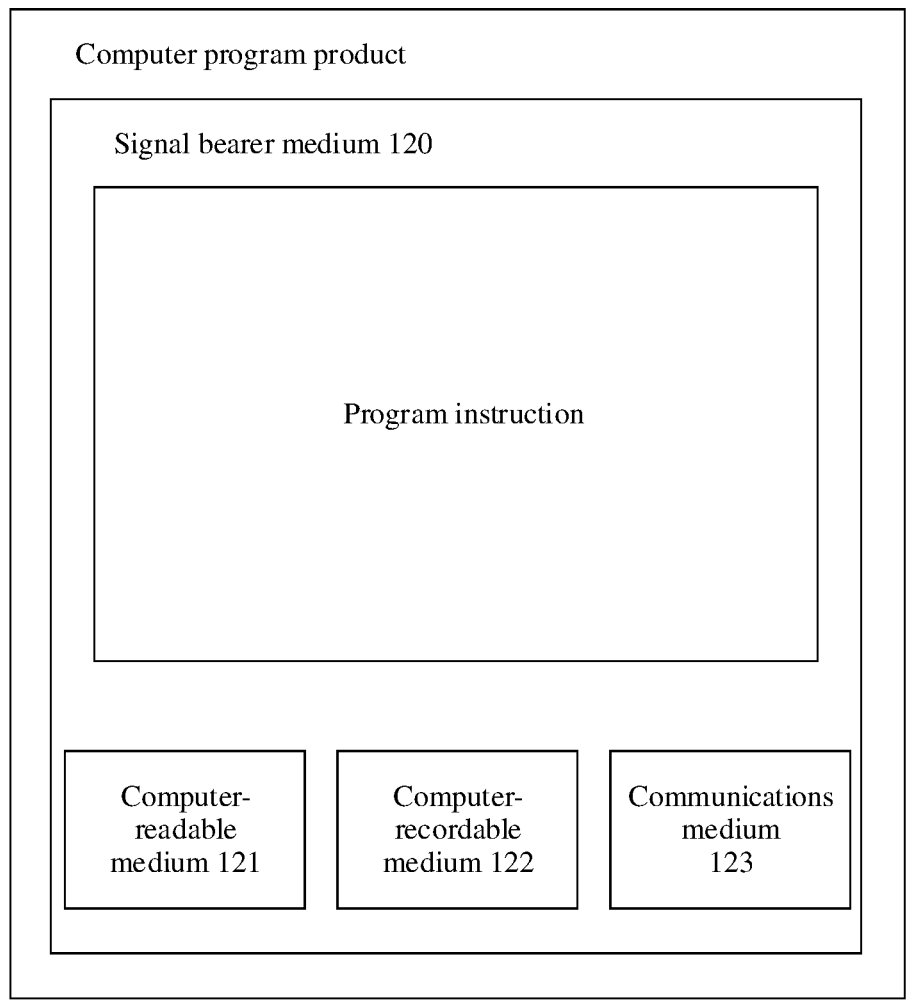
FIG. 12 is a schematic diagram of a structure of a computer program product according to an embodiment of this application.

FIG. 12 schematically shows a conceptual partial view of a computer program product according to an embodiment of this application. The computer program product includes a computer program used to execute a computer process on a computing device.

In an embodiment, the computer program product is provided by using a signal bearer medium 120. The signal bearer medium 120 may include one or more program instructions. When the one or more program instructions are run by one or more processors, the functions or some of the functions described in FIG. 5 may be provided. Therefore, for example, one or more features described with reference to S101 to S106 in FIG. 5 may be borne by one or more instructions associated with the signal bearer medium 120. In addition, the program instructions in FIG. 12 are also described as example instructions.

In some examples, the signal bearer medium 120 may include a computer-readable medium 121, for example, but is not limited to, a hard disk drive, a compact disk (CD), a digital video disc (DVD), a digital tape, a memory, a read-only memory (ROM), or a random access memory (RAM).

In some implementations, the signal bearer medium 120 may include a computer-recordable medium 122, for example, but is not limited to, a memory, a read/write (R/W) CD, or an R/W DVD.

In some implementations, the signal bearer medium 120 may include a communications medium 123, for example, but is not limited to, a digital and/or analog communications medium (for example, an optical fiber, a waveguide, a wired communication link, or a wireless communication link).

The signal bearer medium 120 may be conveyed by the communications medium 123 in a wireless form (for example, a wireless communications medium that complies with the IEEE 1202.11 standard or another transport protocol). The one or more program instructions may be, for example, one or more computer-executable instructions or one or more logic implementation instructions.

In some examples, an AS pair verification apparatus described with reference to FIG. 5 may be configured to provide various operations, functions, or actions in response to the one or more program instructions in the computer-readable medium 121, the computer-recordable medium 122, and/or the communications medium 123.

It should be understood that the arrangement described herein is merely used as an example. Therefore, a person skilled in the art understands that another arrangement and another element (for example, a machine, an interface, a function, a sequence, and a functional group) can be used as replacements, and some elements may be omitted together depending on an expected result.

In addition, many of the described elements are functional entities that may be implemented as discrete or distributed components, or implemented in any appropriate combination at any appropriate location in combination with another component.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer-executable instructions are executed on a computer, the procedures or functions according to the embodiments of this application are all or partially generated.

The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner.

The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely non-limiting examples of specific implementations and are not intended to limit the protection scope, which is intended to cover any variation or replacement readily determined by a person skilled in the art. Therefore, the claims shall define the protection scope.

What is claimed is:

1. An autonomous system (AS) pair verification method, applied to a network device, comprising:
    obtaining path information, wherein the path information comprises an AS pair, and the AS pair comprises two adjacent AS numbers in the path information;
    determining region information of a region to which the AS pair belongs; and
    verifying the AS pair based on the region information,
    wherein the verifying of the AS pair based on the region information comprises:
    verifying the AS pair based on the region information and an authorization database entry,
    wherein before the verifying of the AS pair based on the region information and the authorization database entry, the method further comprises:
    obtaining the authorization database entry, and the obtaining of the authorization database entry comprises:
    receiving a message from a server wherein the message comprises an AS pair having a preset business relationship and a region identifier of a region to which the AS pair having the preset business relationship belongs; and
    generating the authorization database entry based on the message.

2. The method according to claim 1, wherein the verifying of the AS pair based on the region information and the authorization database entry comprises:
    upon determining that the authorization database entry comprises an authorization entry that comprises the AS pair and a region identifier corresponding to the region information, determining that the AS pair is successfully verified.

3. The method according to claim 1, wherein the verifying of the AS pair based on the region information and the authorization database entry comprises:
    upon determining that the authorization database entry does not comprise an authorization entry that comprises the AS pair and a region identifier corresponding to the region information, determining that the AS pair fails to be verified.

4. The method according to claim 1, wherein the determining of the region information of the region to which the AS pair belongs comprises:
    determining, from routing information comprising the path information, the region information of the region to which the AS pair belongs; or
    determining, based on a prefix in the routing information, the region information of the region to which the AS pair belongs.

5. The method according to claim 1, wherein the authorization database entry comprises a first authorization database entry, and
    the message is a protocol data unit (PDU) message.

6. The method according to claim 5, wherein the authorization entry database entry further comprises a second authorization database entry; and
    the obtaining of the authorization database entry comprises:
    generating the second authorization database entry based on a network routing table and/or network data, wherein
    the network routing table and/or the network data comprises the AS pair having the preset business relationship and region information of the region to which the AS pair having the preset business relationship belongs.

7. The method according to claim 6, wherein the verifying of the AS pair based on the region information and the authorization database entry comprises:
    verifying the AS pair based on the region information and the first authorization database entry; and
    upon determining that the AS pair fails to be verified, verifying the AS pair based on the region information and the second authorization database entry.

8. The method according to claim 1, wherein the verifying of the AS pair based on the region information and the authorization database entry comprises:
    verifying the AS pair based on the region information and a target authorization entry that is in the authorization database entry and that corresponds to a prefix in the path information, wherein an internet protocol (IP) version of an AS pair in the target authorization entry is the same as an IP version in the prefix in the path information.

9. The method according to claim 1, wherein the path information comprises a plurality of AS numbers arranged in a preset order, and the plurality of AS numbers indicates a path corresponding to the path information; and the method further comprises:
    sequentially verifying all AS pairs in the path information, to verify the path corresponding to the path information.

10. The method according to claim 9, further comprising:
    upon determining that the AS pair in the path information fails to be verified for a first time, reversing an AS pair that has not been verified in the path information; and
    verifying a reversed AS pair, to complete verification of the path corresponding to the path information.

11. The method according to claim 9, wherein the network device is in a first AS; and the method further comprises:
    sending a verification result of the path corresponding to the path information to a target device, wherein the target device is a device that is in the first AS and that is connected to the network device for communication.

12. The method according to claim 1, further comprising:
upon determining that the path information comprises at most one AS pair that fails to be verified, determining that the path corresponding to the path information is successfully verified.

13. The method according to claim 12, further comprising:
generating a first forwarding entry based on the path information.

14. An autonomous system (AS) pair verification method, applied to a network device, comprising:
obtaining path information, wherein the path information comprises an AS pair, and the AS pair comprises two adjacent AS numbers in the path information;
determining region information of a region to which the AS pair belongs; and
verifying the AS pair based on the region information,
wherein the path information comprises a plurality of AS numbers arranged in a preset order, and the plurality of AS numbers indicates a path corresponding to the path information; and the method further comprises:
sequentially verifying all AS pairs in the path information, to verify the path corresponding to the path information, and
wherein the method further comprises:
upon determining that the path information comprises at least two AS pairs that fail to be verified, determining that the path corresponding to the path information fails to be verified.

15. The method according to claim 14, further comprising:
generating a second forwarding entry based on the path information; and
marking specific information for the second forwarding entry, wherein the specific information indicates whether the second forwarding entry is a high-risk forwarding entry or a low-priority forwarding entry.

16. An autonomous system (AS) pair verification apparatus comprising:
at least one processor; and
one or more memories coupled to the at least one processor and storing instructions that, when executed by the at least one processor, cause the apparatus to:
obtain path information, wherein the path information comprises an AS pair, and the AS pair comprises two adjacent AS numbers in the path information; and
determine region information of a region to which the AS pair belongs; and
verify the AS pair based on the region information,
wherein the verifying of the AS pair based on the region information comprises;
verifying the AS pair based on the region information and an authorization database entry,
wherein the instructions, when executed by the at least one processor, further cause the apparatus to: before the verifying of the AS pair based on the region information and the authorization database entry, obtain the authorization database entry, and
the obtaining of the authorization database entry comprises:
receiving a message from a server, wherein the message comprises an AS pair having a preset business relationship and a region identifier of a region to which the AS pair having the preset business relationship belongs; and
generating the authorization database entry based on the message.

17. The apparatus according to claim 16, wherein
the instructions, when executed by the at least one processor, further cause the apparatus to: upon determining that the authorization database entry comprises an authorization entry that comprises the AS pair and a region identifier corresponding to the region information, determine that the AS pair is successfully verified.

* * * * *